United States Patent
Senftleber et al.

(10) Patent No.: US 11,936,652 B2
(45) Date of Patent: Mar. 19, 2024

(54) PROXIED MULTI-FACTOR AUTHENTICATION USING CREDENTIAL AND AUTHENTICATION MANAGEMENT IN SCALABLE DATA NETWORKS

(71) Applicant: Spredfast, Inc., Austin, TX (US)

(72) Inventors: Michael Senftleber, Driftwood, TX (US); Zachary Daniel Kloepping, Austin, TX (US); Derek Joseph Wene, Austin, TX (US); Blake T. Kobelan, Austin, TX (US); Chad Walter Gowan, Austin, TX (US)

(73) Assignee: Spredfast, Inc., Austin, TX (US)

( * ) Notice: Subject to any disclaimer, the term of this patent is extended or adjusted under 35 U.S.C. 154(b) by 0 days.

(21) Appl. No.: 17/163,293

(22) Filed: Jan. 29, 2021

(65) Prior Publication Data

US 2021/0226952 A1 Jul. 22, 2021

Related U.S. Application Data

(63) Continuation of application No. 16/158,172, filed on Oct. 11, 2018, now Pat. No. 10,999,278.

(51) Int. Cl.
*H04L 9/40* (2022.01)

(52) U.S. Cl.
CPC ...... *H04L 63/0884* (2013.01); *H04L 63/0807* (2013.01); *H04L 63/083* (2013.01)

(58) Field of Classification Search
CPC ............. H04L 63/0884; H04L 63/0807; H04L 63/083; H04L 63/08; H04L 63/10
See application file for complete search history.

(56) References Cited

U.S. PATENT DOCUMENTS 5,627,764 A   5/1997   Schutzman et al.
6,041,311 A   3/2000   Chislenko et al.
(Continued)

FOREIGN PATENT DOCUMENTS

CA   2719285 C   8/2016
CN   102054033 A   5/2011
(Continued)

OTHER PUBLICATIONS

Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).

(Continued)

*Primary Examiner* — Carl G Colin
*Assistant Examiner* — Andrew Suh
(74) *Attorney, Agent, or Firm* — KOKKA & BACKUS, PC

(57) ABSTRACT

Proxied multi-factor authentication using credential and authentication management in scalable data networks is described, including initiating a request by an extension to authenticate a browser to access a data network, the request being associated with an address and transmitted over HTTP, receiving at a proxy browser a first message from the data network in response to the request, the first message comprising authentication data, the authentication data being forwarded to a server in data communication with the proxy browser and the browser, sending a second message from the server to the extension, the second message comprising the authentication data, and transferring authentication data to the data network from the browser and the extension in response to an query from the data network.

20 Claims, 16 Drawing Sheets

(56) References Cited

U.S. PATENT DOCUMENTS

| | | |
|---|---|---|
| 6,146,026 A | 11/2000 | Ushiku |
| 6,363,433 B1 | 3/2002 | Nakajima |
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,031,952 B1 | 4/2006 | Heumann et al. |
| 7,032,030 B1 | 4/2006 | Codignotto |
| 7,130,885 B2 | 10/2006 | Chandra et al. |
| 7,222,156 B2 | 5/2007 | Gupta et al. |
| 7,260,610 B2 | 8/2007 | Grooters et al. |
| 7,409,710 B1 | 8/2008 | Uchil et al. |
| 7,519,672 B2 | 4/2009 | Boss et al. |
| 7,590,636 B1 | 9/2009 | Heumann et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,792,948 B2 | 9/2010 | Zhao et al. |
| 7,818,758 B2 | 10/2010 | Bonet et al. |
| 7,831,912 B2 | 11/2010 | King et al. |
| 7,853,565 B1 | 12/2010 | Liskov |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,095,967 B2 | 1/2012 | Loesch et al. |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,738,715 B2 | 5/2014 | Roy et al. |
| 8,744,937 B2 | 6/2014 | Seubert et al. |
| 8,752,041 B2 | 6/2014 | Akiyoshi et al. |
| 8,767,020 B1 | 7/2014 | Monikandan |
| 8,769,417 B1 | 7/2014 | Robinson et al. |
| 8,813,125 B2 | 8/2014 | Reisman |
| 8,825,515 B1 | 9/2014 | Hanson |
| 8,886,580 B2 | 11/2014 | Grenier et al. |
| 8,892,524 B1 | 11/2014 | Lee et al. |
| 8,943,069 B2 | 1/2015 | Heumann et al. |
| 8,972,428 B2 | 3/2015 | Dicker et al. |
| 9,021,361 B1 | 4/2015 | Pettinati et al. |
| 9,037,735 B1 | 5/2015 | Fallows et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,191,235 B2 | 11/2015 | Clagg et al. |
| 9,229,702 B1 | 1/2016 | Kapulkin et al. |
| 9,251,360 B2 | 2/2016 | Meyer et al. |
| 9,282,098 B1 | 3/2016 | Hitchcock et al. |
| 9,286,102 B1 | 3/2016 | Harel et al. |
| 9,311,683 B1 | 4/2016 | Saylor et al. |
| 9,325,696 B1 | 4/2016 | Balfanz et al. |
| 9,338,186 B2 | 5/2016 | Wollenstein et al. |
| 9,369,454 B2 | 6/2016 | Porzio et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,514,459 B1 | 12/2016 | Doshi et al. |
| 9,519,723 B2 | 12/2016 | Lorenz et al. |
| 9,596,206 B2 | 3/2017 | Bueno et al. |
| 9,596,223 B1 * | 3/2017 | Mezei ............... H04L 63/0838 |
| 9,619,531 B2 | 4/2017 | Wu |
| 9,654,450 B2 | 5/2017 | Ford et al. |
| 9,756,098 B2 | 9/2017 | Kazerani et al. |
| 9,787,664 B1 | 10/2017 | Subbiah et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,178,173 B2 | 1/2019 | Kadowaki et al. |
| 10,180,971 B2 | 1/2019 | Bhave et al. |
| 10,188,905 B2 | 1/2019 | Dohlen |
| 10,204,344 B2 | 2/2019 | Gaedcke et al. |
| 10,204,383 B2 | 2/2019 | Gaedcke et al. |
| 10,264,042 B2 | 4/2019 | Gordon |
| 10,264,073 B2 | 4/2019 | Kadowaki et al. |
| 10,268,726 B1 | 4/2019 | Schiesser |
| 10,270,732 B2 | 4/2019 | Aziz et al. |
| 10,277,928 B1 | 4/2019 | Joliveau et al. |
| 10,277,929 B1 | 4/2019 | McLeod et al. |
| 10,284,723 B1 | 5/2019 | Neuer, III et al. |
| 10,346,449 B2 | 7/2019 | Senftleber et al. |
| 10,417,180 B1 | 9/2019 | Patwardhan |
| 10,430,894 B2 | 10/2019 | Wu |
| 10,489,866 B2 | 11/2019 | Gaedcke et al. |
| 10,491,490 B2 | 11/2019 | Sridhar et al. |
| 10,497,069 B2 | 12/2019 | Gaedcke et al. |
| 10,528,406 B2 | 1/2020 | Klemenz |
| 10,554,697 B1 | 2/2020 | Ledet |
| 10,560,492 B1 | 2/2020 | Ledet |
| 10,594,773 B2 | 3/2020 | Falcao et al. |
| 10,601,937 B2 | 3/2020 | Holzband et al. |
| 10,613,745 B2 | 4/2020 | Mohseni |
| 10,785,222 B2 | 9/2020 | Senftleber et al. |
| 10,855,657 B2 | 12/2020 | Senftleber et al. |
| 10,867,131 B2 | 12/2020 | Scott et al. |
| 10,887,302 B2 | 1/2021 | Thakkar |
| 10,902,462 B2 | 1/2021 | Savage et al. |
| 10,904,639 B1 | 1/2021 | Benson et al. |
| 10,931,540 B2 | 2/2021 | Davis et al. |
| 10,956,459 B2 | 3/2021 | Senftleber et al. |
| 10,999,278 B2 | 5/2021 | Senftleber et al. |
| 11,050,704 B2 | 6/2021 | Senftleber et al. |
| 11,061,900 B2 | 7/2021 | Falcao et al. |
| 11,087,261 B1 | 8/2021 | Basu et al. |
| 11,101,271 B2 | 8/2021 | Ramaswamy |
| 11,153,726 B2 | 10/2021 | Cheung et al. |
| 11,284,221 B2 | 3/2022 | Guo et al. |
| 2001/0025253 A1 | 9/2001 | Heintz et al. |
| 2001/0037469 A1 | 11/2001 | Gupta et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0187871 A1 | 10/2003 | Amano et al. |
| 2003/0225850 A1 | 12/2003 | Teague |
| 2004/0049673 A1 | 3/2004 | Song et al. |
| 2004/0073666 A1 | 4/2004 | Foster et al. |
| 2004/0133697 A1 | 7/2004 | Mamaghani et al. |
| 2004/0174397 A1 | 9/2004 | Cereghini et al. |
| 2004/0199595 A1 | 10/2004 | Banister et al. |
| 2005/0060643 A1 | 3/2005 | Glass et al. |
| 2005/0074126 A1 | 4/2005 | Stanko |
| 2005/0132348 A1 | 6/2005 | Meulemans et al. |
| 2005/0206644 A1 | 9/2005 | Kincaid |
| 2005/0283614 A1 | 12/2005 | Hardt |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0185021 A1 | 8/2006 | Dujari et al. |
| 2006/0206578 A1 | 9/2006 | Heidloff et al. |

(56) References Cited

U.S. PATENT DOCUMENTS

| | | |
|---|---|---|
| 2006/0265740 A1 | 11/2006 | Clark et al. |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0180486 A1 | 8/2007 | Yoon |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0211911 A1 | 8/2010 | Logan et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0196931 A1 | 8/2011 | Clagg et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2011/0320818 A1 | 12/2011 | Krishna et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0310942 A1 | 12/2012 | Haynes et al. |
| 2012/0317198 A1 | 12/2012 | Patton et al. |
| 2012/0331406 A1 | 12/2012 | Baird et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0047149 A1 | 2/2013 | Xu et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0232336 A1 | 9/2013 | Cheung et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |

(56) References Cited

U.S. PATENT DOCUMENTS

| | | |
|---|---|---|
| 2014/0075004 A1 | 3/2014 | Dusen et al. |
| 2014/0082072 A1 | 3/2014 | Kass et al. |
| 2014/0082749 A1 | 3/2014 | Holland et al. |
| 2014/0108675 A1 | 4/2014 | Wu |
| 2014/0109205 A1 | 4/2014 | Lymer et al. |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0245326 A1 | 8/2014 | Kruglick |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0135302 A1 | 5/2015 | Cohen et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0347618 A1 | 12/2015 | Ogita |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0330266 A1 | 11/2016 | Bakhmutov |
| 2016/0335572 A1 | 11/2016 | Bennett et al. |
| 2016/0345074 A1 | 11/2016 | Serbest et al. |
| 2016/0352667 A1 | 12/2016 | Pickett et al. |
| 2016/0378826 A1 | 12/2016 | Bensberg et al. |
| 2017/0012951 A1 | 1/2017 | Mennes et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0093839 A1 | 3/2017 | Whiteside et al. |
| 2017/0111305 A1 | 4/2017 | Bastide et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0201575 A1 | 7/2017 | Song et al. |
| 2017/0255536 A1 | 9/2017 | Weissinger et al. |
| 2017/0264619 A1 | 9/2017 | Narayanaswamy et al. |
| 2017/0278174 A1* | 9/2017 | Harrell ............... G06Q 30/0643 |
| 2017/0300490 A1 | 10/2017 | Kachemir et al. |
| 2017/0339563 A1* | 11/2017 | Singleton, IV ......... H04W 4/80 |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0089328 A1 | 3/2018 | Bath et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0219849 A1* | 8/2018 | Jones ..................... H04L 67/53 |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1* | 2/2019 | Marcovecchio .... H04L 63/1433 |
| 2019/0114093 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0171753 A1 | 6/2019 | Teng et al. |
| 2019/0199711 A1 | 6/2019 | Petrovichev et al. |
| 2019/0228093 A1 | 7/2019 | Falcao et al. |
| 2019/0228144 A1* | 7/2019 | Kermes ............... H04L 63/0861 |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |

(56) References Cited

U.S. PATENT DOCUMENTS

| | | |
|---|---|---|
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2020/0372539 A1 | 11/2020 | Shenfeld et al. |
| 2021/0119967 A1 | 4/2021 | Senftleber et al. |
| 2021/0174391 A1 | 6/2021 | Savage et al. |
| 2021/0176136 A1 | 6/2021 | Davis et al. |
| 2021/0250341 A1 | 8/2021 | Senftleber et al. |
| 2021/0256041 A1 | 8/2021 | Senftleber et al. |
| 2021/0328961 A1 | 10/2021 | Senftleber et al. |
| 2021/0357408 A1 | 11/2021 | Falcao et al. |
| 2021/0409361 A1 | 12/2021 | Feuz et al. |
| 2022/0094683 A1 | 3/2022 | Bishop, III et al. |
| 2022/0124081 A1 | 4/2022 | Gustavson et al. |
| 2022/0166735 A1 | 5/2022 | Evans et al. |
| 2022/0232086 A1 | 7/2022 | Holzband et al. |
| 2023/0130047 A1 | 4/2023 | Senftleber et al. |

FOREIGN PATENT DOCUMENTS

| | | |
|---|---|---|
| CN | 103177095 B | 12/2015 |
| EP | 2031793 A1 | 3/2009 |
| EP | 2857993 B1 | 8/2017 |
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2016114841 A1 | 7/2016 |
| WO | 2019075284 A2 | 4/2019 |
| WO | 2019144159 A1 | 7/2019 |
| WO | 2020232311 A1 | 11/2020 |

OTHER PUBLICATIONS

Dinh, Khanh Q., Non-Final Office Action dated Mar. 17, 2021 for U.S. Appl. No. 16/820,697.
Dinh, Khanh Q., Notice of Allowance and Fee(s) Due dated Apr. 16, 2021 for U.S. Appl. No. 16/820,697.
Fiorillo, James N., Non-Final Office Action dated Jun. 7, 2021 for U.S. Appl. No. 16/827,625.
Frunzi, Victoria E., Final Office Action dated May 17, 2021 for U.S. Appl. No. 16/590,218.
Frunzi, Victoria E., Non-Final Office Action dated Dec. 21, 2020 for U.S. Appl. No. 16/590,218.
Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Mar. 10, 2021 for U.S. Appl. No. 16/695,098.
Goldberg, Ivan R., Non-Final Office Action dated Mar. 3, 2021 for U.S. Appl. No. 16/701,143.
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012.18.
Nano, Sargon N., Notice of Allowance and Fee(s) Due dated May 19, 2021 for U.S. Appl. No. 17/026,152.
Neuman, Clifford B., Proxy-Based Authorization and Accounting for Distributed Systems, IEEE 1993 (Year: 1993).
Rashid, Ishrat, Final Office Action dated Jun. 15, 2021 for U.S. Appl. No. 15/782,653.
Rashid, Ishrat, Non-Final Office Action dated Apr. 2, 2021 for U.S. Appl. No. 15/782,653.
Shaw, Robert A., Final Office Action dated Mar. 16, 2021 for U.S. Appl. No. 16/158,169.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
"Craigslist Online Community." Craigslist.org. Jul. 6, 2010.
Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, Retrieved Jan. 29, 2021; <>.
Arentz et al., Classifying offensive sites based on image content [online], Computer Vision and Image Understanding 94, 295-310, 2004, Retrieved from the Internet.
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.
Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."

(56) References Cited

OTHER PUBLICATIONS

Falcao et al., U.S. Appl. No. 15/877,381, filed Jan. 22, 2018 and entitled, "Temporal Optimization of Data Operations Using Distributed Search and Server Management.".
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Non-Final Office Action for U.S. Appl. No. 15/821,543 dated Aug. 16, 2019.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mesa, Joel, Notice of Allowance and Fee(s) Due dated Feb. 24, 2021 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Niruntasukrat et al., Authorization Mechanism for MQTT-based Internet of Things, IEEE ICC 2016 Workshops: W07-Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Per-

(56) References Cited

OTHER PUBLICATIONS formance of Content and Electronic Messages Among a System of Networked Computing Devices."
Senftleber et al., U.S. Appl. No. 15/782,635, filed Oct. 12, 2017 and entitled, "Computerized Tools To Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Takesue, Masaru, An HTTP Extension for Secure Transfer of Confidential Data. IEEE, 2009 (Year: 2009).
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Goldberg, Ivan R., Final Office Action dated Jan. 13, 2015 for U.S. Appl. No. 13/835,250.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hardt, Dick, The OAuth 2.0 Authorization Framework draft-ieft-oauth-v2-31; Internet Engineering Task Force (IEFT) (Year: 2012).
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
European Patent Office, Extended European Search Report dated Nov. 12, 2021 for European Patent Application No. 19741372.7.
Fiorillo, James N., Final Office Action dated Sep. 27, 2021 for U.S. Appl. No. 16/827,625.
Fiorillo, James N., Notice of Allowance and Fee(s) Due dated Nov. 24, 2021 for U.S. Appl. No. 16/827,625.
Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Ofori-Awuah, Maame, Non-Final Office Action dated Sep. 28, 2021 for U.S. Appl. No. 14/929,209.
Rashid, Ishrat, Non-Final Office Action dated Dec. 22, 2021 for U.S. Appl. No. 15/782,653.
Shaw, Robert A., Non-Final Office Action dated Dec. 27, 2021 for U.S. Appl. No. 16/158,169.
Barua et al., "Protecting Web Browser Extensions from JavaScript Injection Attacks," 2013 International Conference on Engineering of Complex Computer Systems, IEEE. (Year: 2013).
Birgisson et al., "Macaroons: Cookies with Contextual Caveats for Decentralized Authorization in the Cloud," Network and Distributed System Security (NDSS) Symposium, Feb. 23-26, 2014, San Diego, California. (Year: 2014).
Dinh, Khanh Q., Non-Final Office Action dated Apr. 28, 2022 for U.S. Appl. No. 17/334,135.
Dinh, Khanh Q., Notice of Allowance and Fee(s) Due dated Jun. 29, 2022 for U.S. Appl. No. 17/334,135.
Fiorillo, James N., Non-Final Office Action dated Feb. 27, 2023 for U.S. Appl. No. 17/567,073.
Fiorillo, James N., Notice of Allowance and Fee(s) Due dated May 11, 2023 for U.S. Appl. No. 17/567,073.
Kim, Harry, Notification of Transmittal of the International Search Report and the Written Opinion of the International Searching Authority, or the Declaration, dated Jan. 11, 2022 for International Application No. PCT/US2021/050979.
Louw et al., "Enhancing web browser security against malware extensions," J Computing Virol (2008), Published Jan. 12, 2008, Springer-Verlag France. (Year: 2008).
Meng, Jau Shya, Non-Final Office Action dated Nov. 8, 2022 for U.S. Appl. No. 17/332,391.
Mesa, Joel, Non-Final Office Action dated Mar. 31, 2022 for U.S. Appl. No. 17/244,868.

(56) References Cited

OTHER PUBLICATIONS

Mesa, Joel, Notice of Allowance and Fee(s) Due dated Aug. 23, 2022 for U.S. Appl. No. 17/244,868.
Nano, Sargon N., Non-Final Office Action dated Mar. 21, 2022 for U.S. Appl. No. 17/365,222.
Nano, Sargon N., Notice of Allowance and Fee(s) Due dated Apr. 28, 2022 for U.S. Appl. No. 17/365,222.
Perungavoor, Venkat, Non-Final Office Action dated Jun. 29, 2022 for U.S. Appl. No. 17/027,646.
Perungavoor, Venkatanaray, Notice of Allowance and Fee(s) Due dated Oct. 27, 2022 for U.S. Appl. No. 17/086,260.
Perungavoor, Venkatanary, Non-Final Office Action dated Aug. 19, 2022 for U.S. Appl. No. 17/086,260.
Perungavoor, Venkatanary, Non-Final Office Action dated Jun. 29, 2022 for U.S. Appl. No. 17/086,260.
Rashid, Ishrat, Notice of Allowance and Fee(s) Due, dated Sep. 16, 2022 for U.S. Appl. No. 15/782,653.
Shaw, Robert A., Notice of Allowance and Fee(s) Due dated Jun. 2, 2022 for U.S. Appl. No. 16/158,169.
Shaw, Robert A., Notice of Allowance and Fee(s) Due dated Jun. 22, 2023 for U.S. Appl. No. 17/854,606.
Shinjo et al., A Distributed Web Browser as a Platform for Running Collaborative Applications, International Conference on Collaborative Computing: Networking, Applications and Worksharing (CollaborateCom), Orlando, Florida, USA, Oct. 15-18, 2011 (Year: 2011).
Singh, Amardeep, IP Australia, Examination Report No. 1 for Standard Patent Application for Australia Patent Application No. 2022200375 dated Feb. 17, 2023.

\* cited by examiner

PROXIED MULTI-FACTOR AUTHENTICATION USING CREDENTIAL AND AUTHENTICATION MANAGEMENT IN SCALABLE DATA NETWORKS

CROSS-REFERENCE TO RELATED APPLICATIONS

This application is a continuation application of copending U.S. patent application Ser. No. 16/158,172 filed on Oct. 11, 2018, and entitled "PROXIED MULTI-FACTOR AUTHENTICATION USING CREDENTIAL AND AUTHENTICATION MANAGEMENT IN SCALABLE DATA NETWORKS," all of which is herein incorporated by reference in its entirety for all purposes.

FIELD

The present invention relates generally to computer science, data science, application architecture, and computer data security. More specifically, techniques for proxied multi-factor authentication using credential and authentication management in scalable data networks is described.

BACKGROUND

As various computer programs ranging from operating systems to client and server-side applications to online Internet platforms to distributed and cloud computing systems, and other types of software (hereafter "software" or "applications") increase in complexity, design, and scale, there is also an increase in problems associated with managing large amounts of data and providing data security against unauthorized access to data across a large distributed platforms and data networks.

Accessing and using applications that need to scale to support millions of clients (e.g., computers, servers, desktops, laptops, smart phones, mobile phones, cellular communication devices, tablet computers, and the like) and user accounts are often hampered by various types of operations that need to be performed in order to provide an efficient and scalable computing environment, many of which are distributed globally across numerous servers or server facilities and services, including cloud-based computing systems. Systems such as social networks and social media typically rely upon conventional solutions to address difficult operations such as data security, account security, and data privacy, but which are often limited and restrictive to users, including organizational accounts that may have many users. However, many conventional solutions for providing data security, account security, and data privacy are also problematic because of an inability to scale and support multi-client or multi-threaded operations such as authentication or login operations or to work with third party technology providers to provide data security. As a conventional example, social networks and social media are configured to provide both individual and organizational users with single-client accounts. However, if an organization has multiple users that require access to a single account for a social network, this can be problematic using conventional authentication techniques because only a single client can access a given account at any time, which is not only efficient, but stifles organizational use of valuable social media and networks to deliver, for example, commercial content such as advertising, promotions, coupons, or contextually or thematically-related content that users may find useful or valuable. Organizations with social media marketing departments, which may have one to many users are unable to effectively use powerful communication media such as social media and social networks because of technical limitations of conventional authentication solutions that render these inefficient, unscalable, and lacking in terms of organizational support.

Thus, what is needed is a solution for authenticating access to online accounts without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
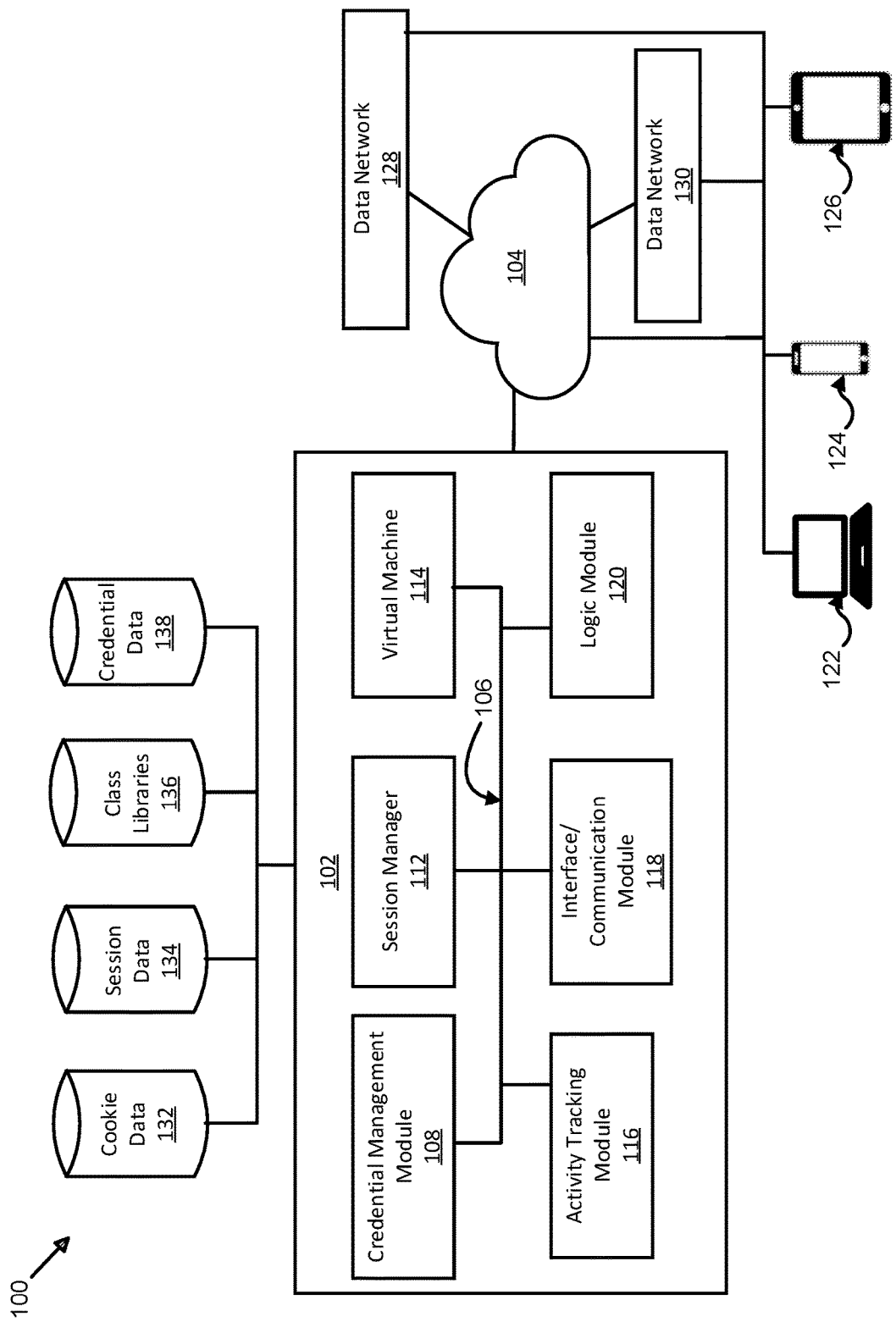
FIG. 1 illustrates an exemplary system for proxied multi-factor authentication using credential and authentication management in scalable data networks.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with such examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™ or those developed by data facility and computing providers such as Amazon® Web Services, Inc. of Seattle, Wash., FMP, Oracle®, Salesforce.com, Inc., or others, without limitation or restriction to any particular instance or implementation. Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, Calif., Snapchat® as developed by Snap® of Venice, Calif., Messenger as developed by Facebook®, WhatsApp®, or Instagram® of Menlo Park, Calif., VKontakte ("VK") of St. Petersburg, Russia, Pinterest® of San Francisco, Calif., LinkedIn® of Mountain View, Calif., and others, without limitation or restriction. In some examples, data may be formatted and transmitted (i.e., transferred over one or more data communication protocols) between computing resources using various types of data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), or others, without limitation. As described herein, disclosed processes implemented as software may be programmed using Java®, JavaScript®, Scala, Python™, XML, HTML, and other data formats and programs, without limitation. References to various layers of an application architecture (e.g., application layer or data layer) may refer to a stacked layer application architecture such as the Open Systems Interconnect (OSI) model or others.

FIG. 1 illustrates an exemplary system for proxied multifactor authentication using credential and authentication management in scalable data networks. Here, system 100 includes platform 102, network computing cloud (hereafter "cloud") 104, data bus 106, credential management module 108, session manager 112, virtual machine 114, activity tracking module 116, interface/communication module 118, logic module 120, clients 122-126, data networks 128-130, and databases 132-138 (i.e., cookie data 132, session data 134, class libraries 136, and credential data 138). For purposes of illustration, the elements shown in FIG. 1 may be varied in quantity, function, configuration, and layout and are not limited to the examples shown and described. In some examples, credential management module 108, session manager 112, virtual machine 114, activity tracking module 116, interface/communication module 118, and logic module 120 are in data communication with each other and may be configured to transfer data over data bus 106, which may be implemented as electrical conduit, electronic or logical data connections, or a network of computing and networking resources such as servers, clients, routers, switches, gateways, and the like, without limitation or restriction to any type of equipment or software. Data may be in analog or digital form and the descriptions provided herein are not limited or restricted to any particular form. As shown, platform 102 may be configured to manage credentials and authentication information, data, and processes in order to provide multiple clients (e.g., clients 122-126, which may be a desktop computer (122), mobile computing device (124) such as a smart phone or cell phone, or portable or mobile computing tablet (126) such as an iPad® from Apple Computer Corporation of Cupertino, Calif. or a Surface® tablet from Microsoft Corporation of Redmond, Wash., or the like) with the ability to access data networks 128-130 over cloud 104, the latter of which may be implemented as a singular or multiple networks or computing clouds. As shown and described, data networks 128-130 may refer to a social media-based data network that posts (i.e., publishes; to be distinguish from a POST request, the latter of which being a call used to send or receive data using hypertext transfer protocol (HTTP) data requests), organizes, and manages data provided for various types of social media purposes, without limitation or restriction. Although numerous examples of social media were provided above, social media is typically broad in scope and represented, here, by data networks 128-130, which may be implemented in a variety of settings and environments, including as an integrated set of features provided for various types of users such as users engaging in social communication, online buyers and sellers (e.g., ecommerce communities), information providers, reviews and ratings websites, blogs (e.g., websites logs or web logs, which are a type of social media that provides certain types of information that may be thematically organized), vlogs (e.g., "vlogs" refer to video logs, which are similar to blogs, but incorporating video-formatted content such as that found on data networks like YouTube® of San Bruno, Calif. (a subsidiary of Alphabet® of Mountain View, Calif., the parent company of another social media-provider, Google® also of Mountain View, Calif.)), and others. In other words, social media may be found in many online websites, mobile applications, and other data networked/connected properties and platform 102 and the techniques described herein are intended to be applicable to providing credential and authentication management features and functionality. Data networks 128-130 are intended to be representative and, like any element shown or described in this Detailed Description or the corresponding drawings, is not limited in either scope, configuration, function, design, layout, shape, or constructively-assigned definition. In some examples, data networks 128-130 are representative of social media for purposes of describing the techniques presented herein.

Here, platform 102 is configured to implement credential and authentication management features using credential management module 108, which works cooperatively with modules 112-120. For example, logic module 120 exchanges control signals and instructions with credential management module 108. Here, credential management module 108 may be implemented using programming languages such as Java® and Scala for platform 102, which may be configured to provide credential and authentication management as well as other features. As shown and described, credential management module 108 provides control and instruction signals related to providing authentication data between various clients (e.g., clients 122-126) and data networks 128-130, all of which may be varied in quantity, type, function, and implementation without limitation or restriction to the examples shown and described. Authentication data, in some examples, may be stored in one or more of cookie data 132, session data 134, or credential data 138, and may include login data (e.g., username, password, tokens, hashes), authentication codes (i.e., alphanumeric codes that are generated by data networks 128-130 and sent to clients 122-126 when the latter elements are requesting access to the former and which requires entry by clients 122-126 through World Wide Web browsers (not shown; hereafter "browsers"), or links to third party authentication services that are presented (i.e., rendered or displayed on a graphical user interface) when queried by data networks 128-130. In other examples, authentication data may include techniques for multiple step or multiple factor ("multi-factor") authentication data or access security or any other forms or types of data security techniques, processes, or applications that may be used to authenticate access by a client (e.g., clients 122-126) to data networks 128-130 and data published, shown, organized, managed, or otherwise accessed once authorized. Credential management module 108 may also be used to direct queries between platform 102 and clients 122-126 to data networks 128-130 to send various requests to retrieve or send authentication data, as described above, using data transfer protocols such as HTTP, HTTPs (i.e., hypertext transfer protocol secure (an extension of HTTP), TCP/IP, SMTP, or others, wired or wireless, without limitation or restriction). In some examples, credentials (e.g., account access-related data that identifies a specific account or client associated with authorized access to data networks (e.g., data networks 128-130)) and authentication data may be directed by credential management module 108 to be stored in credential data 138. As used herein, the terms "credential," "credentials," "credential data," and "authentication data" may be used interchangeably.

If access to data networks 128-130 over cloud 104, in some examples, is authorized (as used herein, "authorized," "granted," "permitted," "provided" are used synonymously and interchangeably without limitation), then data networks 128-130, as described in greater detail below, may provide session data 134 (e.g., control data and instructions that are used to establish a "session" or period of access between one or more of clients 122-126 and data networks 128-130) and cookie data 132 (which refers to data associated with a "cookie," a data file issued or generated by data networks 128-130 that includes data, information, parameters, or attributes such as an expiration date/time for access to data networks 128-130) that, once received and processed by a browser on one or more of clients 122-126, permit access to data on data networks 128-130. For example, if client 122 requests access to data network 128 (e.g., Twitter®, Instagram®, Tinder®, Amazon.com®, or the like), a GET request (i.e., over HTTP) may be posted by client 122 to data network 128, but may also be sent to platform 102 and processed by credential management module 108. The GET request or other type of query requesting access and sent over cloud 104 to platform 102 be controlled for purposes of processing the responsive data sent by data network 128. In other words, if data network 128 sends an authentication code to be entered into a "pop-up window" (i.e., a window or sub-browser that appears as a displayed overlay over a browser) or a field within an interface presented within a browser, the authentication code (not shown) may be directed to be stored by credential data 138 utilizing various calls and operations supported by virtual machine 114 and class libraries 136. In some examples, virtual machine 114 may be used to provide a state in which compiled program code for an application (e.g., credential management module 108) is executed to perform the features and functions described herein.

Referring back to credential management module 108, in other examples, a GET request is not posted by clients 122-126, but instead authentication data (e.g., username, password, passcode, authentication code, or the like) may be sent as encapsulated data from one or more of clients 122-126 to one or more of data networks 128-130. Once sent, the authentication data may by directed for storage in credential data 138 by credential management module 108. In still other examples, when access is requested, one or more of clients 122-126 may send authentication data to platform 102 and credential management module 108, which is then processed and stored by the latter in credential data 138 before it is transmitted (as used herein, "transmitted" and "transferred" may be used interchangeably without limitation and are intended to refer to data transfer between various elements shown and described, without limitation to the type of data transfer or control protocol used) to one or more of data networks 128-130. Once processed and stored, credential management module 108 may retrieve authentication data from storage within an addressable memory or storage facility such as credential data 138 and sent to one or more of data networks 128-130 to provide subsequent access to one or more of clients 122-126. In other words, using the same authentication data, credential management module 108 permits multiple clients (e.g., clients 122-126) to access an account on social media without requiring each client to have an individual account, which is neither scalable nor efficient for large organizations seeking to utilize a data network (e.g., data networks 128-130) to perform various functions ranging from remote technical support to social media marketing to financial reconciliation to accounting. By permitting a singular account registration, which subsequently yields authentication data that is used to gain approved access to a data network such as those described herein, multiple client organizations regardless of size, scale, distributed computing architecture, geographical login location (i.e., a location from which a client posts a GET request to one or more of data networks 128-130), or other attributes associated with authenticating account access, can efficiently and effectively use data networks more rapidly.

Referring back to FIG. 1, authentication data stored in credential data 138, along with other data, may be transferred between platform 102 (e.g., one or more of credential management module 108, session manager 112, activity tracking module 116, or logic module 120) over an application programming interface (API) using interface/communication module 118. In some examples, an API provided by either platform 102 or data networks 128-130 may be used to establish, over cloud 104 (or other computing or data networks such as the Internet or World Wide Web), data connectivity to not only exchange authentication data, but also session data.

In some examples, session data may refer to data transferred between one or more of clients 122-126 and data networks 128-130 after authentication data has been approved to permit access. Session data may include any type, form, or format of data including, in some examples, text, audio, video, multi-media, graphical, augmented reality (AR), virtual reality (VR), 3D (i.e., three dimensionally presented data), holograms, holographs, or others, without limitation. In some examples, activity tracking module 116 may be configured to track control data, signals, or instructions from logic module 120 to store some, part, all, or none of session data transferred between data networks 128-130 and clients 122-126. As used herein, "tracking" may be used interchangeably with "monitoring" and include various functions such as copying, sampling, testing, processing, hashing, tagging, or the like for purposes directed by logic module 120, which may be configured to receive user input or data over interface/communication module 118 to do so. In some examples, tracking may be performed natively (i.e., within the operating system or application environment of a browser) without requiring additional software other than an extension, as described herein, in data communication using one or more data communication protocols with platform 102. In other examples, activity tracking module 116 may be configured to track no data, in which case no session data is stored in session data 134. Here, session data for sessions between data networks 128-130 and clients 122-126 may be stored in session data 134, along with "cookies" (i.e., data files that are configured to include processed authentication data (i.e., data that is sent by data networks 128-130 to one or more of clients 122-126 for purposes of permitting access to data on data networks 128-130 for a finite or indefinite period of time (i.e., a session)) and other control data such as an expiration date and time that is used to manage access), which may be stored in a separate data repository, database, or data facility such as cookie data 132. As used herein, the terms "database," "data repository," "data farm," "data facility" may be used interchangeably without limitation.

Referring back to FIG. 1, when a session is established between one or more of clients 122-126 and data networks 128-130, not only does credential management module 108 direct the storage of the authentication data in credential data 138, but it may also store session and cookie data in session data 134 and cookie data 132, respectively, for use in authorizing other clients to access one or more of data networks 128-130, but using a construct of a singular account (i.e., not requiring multiple users to create individual accounts to access data networks 128-130). In other examples, clients 122-126 that are identified as being attributable to multiple IP addresses, but logically grouped together as, for example, part of the same organization, department, company, division, or the like, can use the credential and authentication management techniques described herein without limitation. In still other examples, the elements of system 100 shown and described may be varied in design, configuration, and function without limitation to those shown and described.

Figure 2:
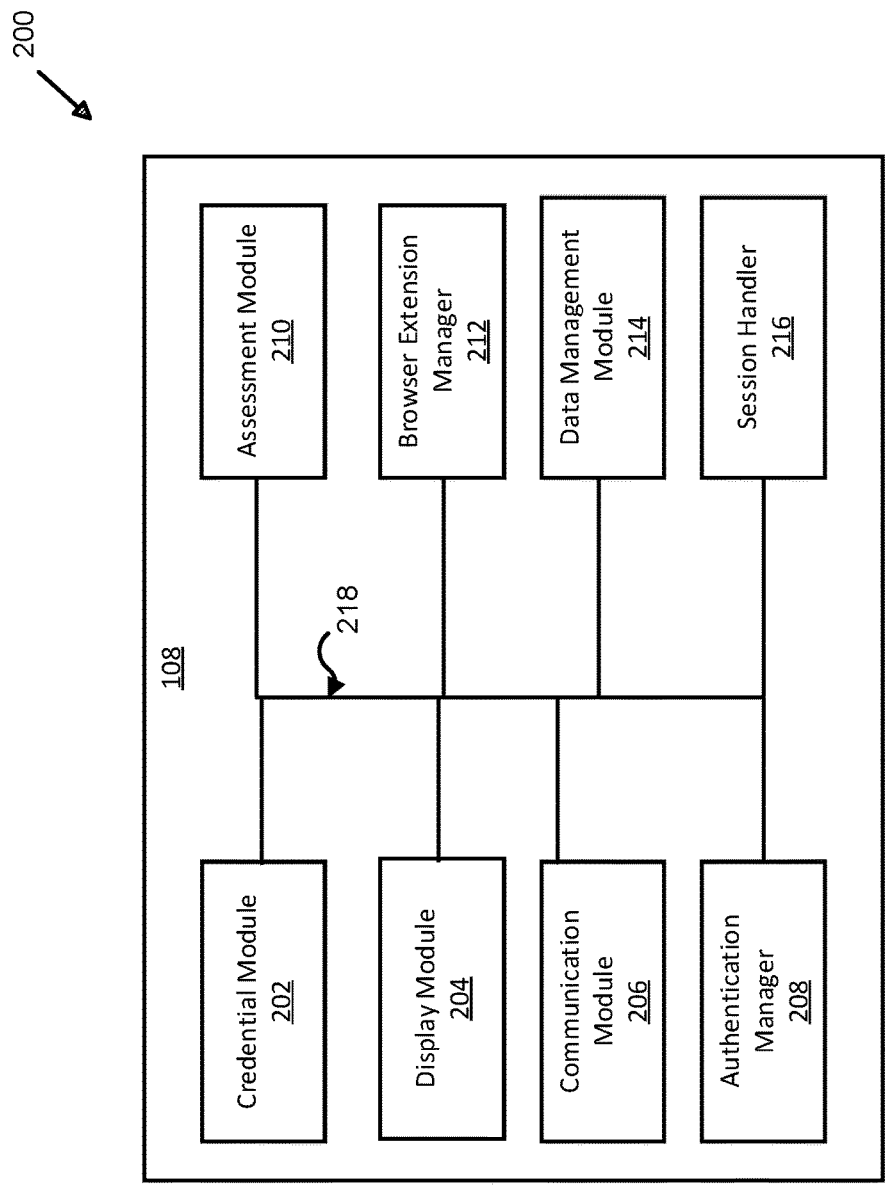
FIG. 2 illustrates an exemplary application architecture for a credential management module.

FIG. 2 illustrates an exemplary application architecture for a credential management module. Here, credential management module 108 (FIG. 1) is shown in greater detail, including credential module 202, display module 204, communication module 206, authentication manager 208, assessment module 210, browser extension manager 212, data management module 214, and session handler 216, all of which are in data communication with each other, regardless of form, format, or protocol, using data bus 218. In some examples, credential management module 108 (FIG. 1) includes sub-modules and computer processor-based elements 202-218, which are configured to perform various functions to authenticate access by one or more of clients 122-126 (FIG. 1) to one or more data networks (e.g., data networks 128-130 (FIG. 1)). Credential module 202, in some examples, may be configured to direct the storage and retrieval of data (using various types of database and data handling schema such as SQL, MySQL, R, RDF, SPARQL, or others) by pointing queries to storage locations addressed on memories, volatile or non-volatile, such as credential data 138 (FIG. 1) from which credential data and authentication data may be retrieved. In other examples, credential module 202 may also construct queries in various types of programming and data handling languages and formats to retrieve or store credential data or authentication data in, for example, credential data 138 (FIG. 1). Credential module 202 may also be configured to transfer data over data bus 218 to cooperatively process credential data and/or authentication data for various purposes such as generating and rendering a status bar in a browser window using display module 204, transferring data (e.g., credential data, authentication data, login data, and the like) to clients 122-126 (FIG. 1), data networks 128-130 (FIG. 1), platform 102, or other clients, endpoints, or destination addresses (e.g., other computers, servers, or clients), or generating assessments using assessment module 210, which may be configured to work cooperatively with credential data and/or authentication data.

In some examples, assessment module 210 may be configured to work with credential module 202, authentication manager 208, data management module 214, and session handler 216 to generate assessments that are constructed based on evaluating, using user-specific rules, artificial intelligence, machine learning, or deep learning techniques, data that is being transferred between clients 122-126 (FIG. 1) and data networks 128-130 (FIG. 1) after receiving access upon approval of credentials and/or authentication data by data networks 128-130. Assessments may be constructed for various purposes, including evaluating the number of views, unique impressions, click-through rates, conversion rates, latency, data transfer rates, error rates, or any other type of attribute associated with transferring data between a browser (having an installed browser extension managed by browser extension module 212) and platform 202. As an example, the described techniques may be used by a marketing organization that is generating and providing advertising-related content to a social network using platform 202, but due to the techniques and processes provided by credential management module 108, assessments can be generated that provide users with data as to the efficacy, efficiency, and overall data performance of the content placed, published, curated, served, or otherwise operated on using the techniques described herein. Further, once a session has been established between one or more clients using a singular account and the credential management and authentication techniques described herein, the data transferred between a data network (e.g., data networks 128-130 and clients 122-126) may be monitored, sampled, tracked, cached, copied, or modified for purposes determined based on the receipt of control data and signals received by communication module 206 using interface/communication module 118. In some examples, control data and signals may be generated from some clients that have enhanced or greater permissioning or authenticated access than other clients, permitting these clients to perform more or different functions than others. Conversely, authentication manager 208 and credential module 202 may also be configured to restrict access based on the type of credentials or authentication stored by credential management module 108 (FIG. 1) in credential data 138 (FIG. 1).

As discussed above, credential module 202 may be configured to manage authentication data being transferred between a data network (e.g., data networks 128-130 (FIG. 1)) and a client (e.g., clients 122-126) in some examples. Once authentication is approved and access to a given data network is permitted, credential module 202 may be configured to manage access to subsequent clients that transmit GET requests to a data network in order to obtain access to data managed, stored, or otherwise controlled by said data network. As an example, a client associated with a social marketing organization may be attempting to access, substantially simultaneously (i.e., in near-real time) a social network such as Instagram® in order to manage data or data attributes associated with content that it has tagged or identified that trigger content from the organization to be served in contextual relevance to other content that is being generated by another client that is not logically or technically grouped with the same organization. By using the techniques described herein, another user from the same group can also gain authenticated access (i.e., access granted by a data network (e.g., data networks 128-130 (FIG. 1)) to the same data network, but use only a single set of credentials, credential data, authentication data, or login data associated with a given account. In other examples, using the techniques described herein, multiple users associated with an organization can access the data network by having credential management module 108 (FIG. 1) handle the transfer of credential and authentication data to a data network, provide multi-factor authentication (e.g., receiving a code in response to a request to authenticate credentials or authentication data and then inputting said code in response to a further query from the data network) without requiring external user input.

Further, data management module 214 may be configured to work cooperatively with browser extension manager 212 to transfer data between data networks 128-130 (FIG. 1), clients 122-126 (FIG. 1), platform 102 (FIG. 1), and credential management module 108 (FIG. 1) for various purposes, some of which were previously discussed. Tracking and monitoring data flow between endpoints (e.g., data networks 128-130 (FIG. 1), clients 122-126 (FIG. 1), platform 102 (FIG. 1), and credential management module 108 (FIG. 1)) may be performed by data management module 214, including credential data, authentication data, login data, and data transferred in response to queries, requests, posts, or calls. Still further, data management module 214 may be configured to transfer to browser extension manager 212 to provide additional data that may be useful to a given client such as a timeout or status indicator rendered graphically on a browser that displays, for example, time elapsed in a session, session expiration, number of other users participating in the session, but on other clients, and other functions. In still other examples, browser extension manager 212 may be configured to manage a browser extension ("extension") that is downloaded and installed in a browser application or operating system using a browser (i.e., an application configured to retrieve, send, display data and information from data networks and applications such as those described herein. In some examples, extensions installed on browsers are managed by platform 102 (FIG. 1) using credential management module 108 (FIG. 1) and browser extension manager 212. All of the computing elements shown and described above in connection with platform 102 (FIG. 1), credential management module 108 (FIG. 1), and those shown here in FIG. 2 may be programmed using object oriented programming languages such as Java, Scala, JavaScript, and others, without limitation. Other programming languages that generate program code directly in binaries, objects, or other types of data structures may be used and are not limited to the examples shown and/or described. In still other examples, credential management module 108 (FIG. 1) and as shown in environment 200 and elements 202-218 may be varied in design, configuration, and function without limitation to those shown and described.

Figure 3A:
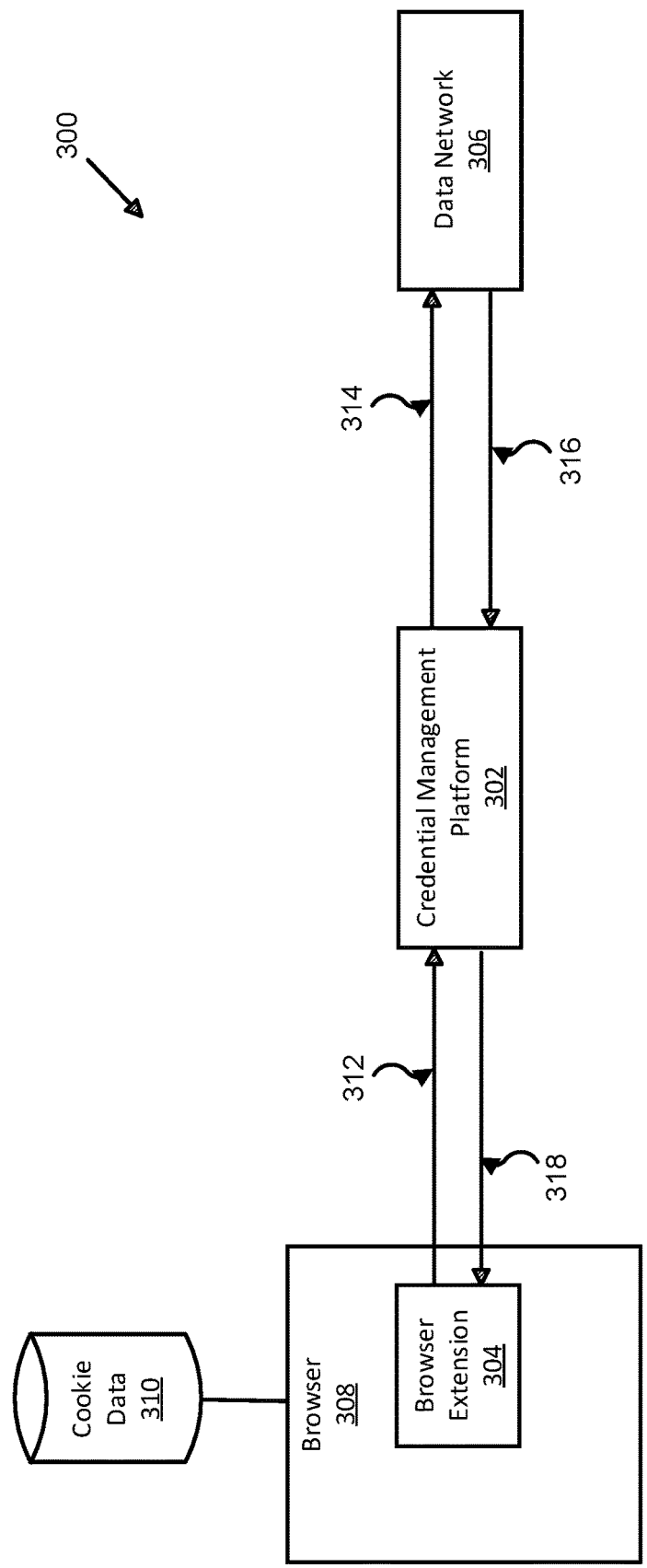
FIG. 3A illustrates an exemplary data flow for credential and authentication management in scalable data networks.

FIG. 3A illustrates an exemplary data flow for credential and authentication management in scalable data networks. Here, system 300 includes credential management platform 302, browser extension 304, data network 306, browser 308, cookie data 310, and data flow paths 312-318. As shown, browser extension 304 may be installed on browser 308. In some examples, browser extension 304 may be an application, applet, program, or other type of software code that is downloaded and installed on a client (e.g., clients 122-126 (FIG. 1)) and configured for data transfer with credential management platform 302. In some examples, credential management platform 302 may be implemented similarly to platform 102 (FIG. 1) and is not limited to any particular implementation, configuration, design, layout, or function.

Here, credential data and authentication data (collectively "authentication data) can be transferred over data flow paths 312-318 between credential management platform 302 and browser 308 and data network 306. In some examples, data flow paths 312-318 may be implemented as logical or actual networking paths or routes that consist of various types of routing equipment, conduits, and networking equipment used to implement wired or wireless data communications. Here, credential management platform 302 may be implemented and configured to transfer authentication data received from data network 306 to browser 308 and browser extension 304. In some examples, authentication data may be stored, once received at browser 308, in cookie data 310. In other words, authentication data may include a cookie (e.g., session cookie) from data network 306 that, once input at browser 308, may be approved (i.e., grant) access to data network 306. As shown, system 300 is an exemplary embodiment of a data flow diagram for transmitting authentication data to and from browser 308 and browser extension 304 to data network 306. Further, monitoring, tracking, sampling, caching, copying, or modifying session data transferred between data network 306 and browser 308 can be performed by credential management platform 302.

In some examples, a GET request (not shown) may be transmitted by browser 308 and browser extension 304 (the latter of which is in data communication with credential management platform 302) to data network 306 over data path 312. Upon receiving a request (e.g., GET request or call) over data path 312, credential management platform 302 (e.g., platform 102 (FIG. 1)) may be configured to transmit authentication data over data path 314 to data network 306. As shown, credential management platform 302 is configured to provide authentication data to data network 306 by retrieving the requested authentication data from a location to which credential module 202 is pointed. If authentication data transmitted over data path 314 by credential management platform 302 is accepted (i.e., approved), data network 306 may be configured to generate and transmit over data path 316 session data. Session data may be tracked (as described above) by credential management module 302 once received over data path 316, but prior to transmitting the session data over data path 318 to browser 308 (the requesting endpoint for the session data). As shown, system 300 and credential management platform 302 are configured to provide authentication data to data network 306 to provide access to browser 308, but without exposing or revealing authentication data to browser 308. Further, data network 306 upon processing authentication data from credential management platform 302 registers a session and issues a cookie (which may have a session expiration date/time) to browser 308 without registering credential management platform 302. In other examples, system 300 and the accompanying elements may be varied in design, configuration, and function without limitation to those shown and described.

Figure 3B:
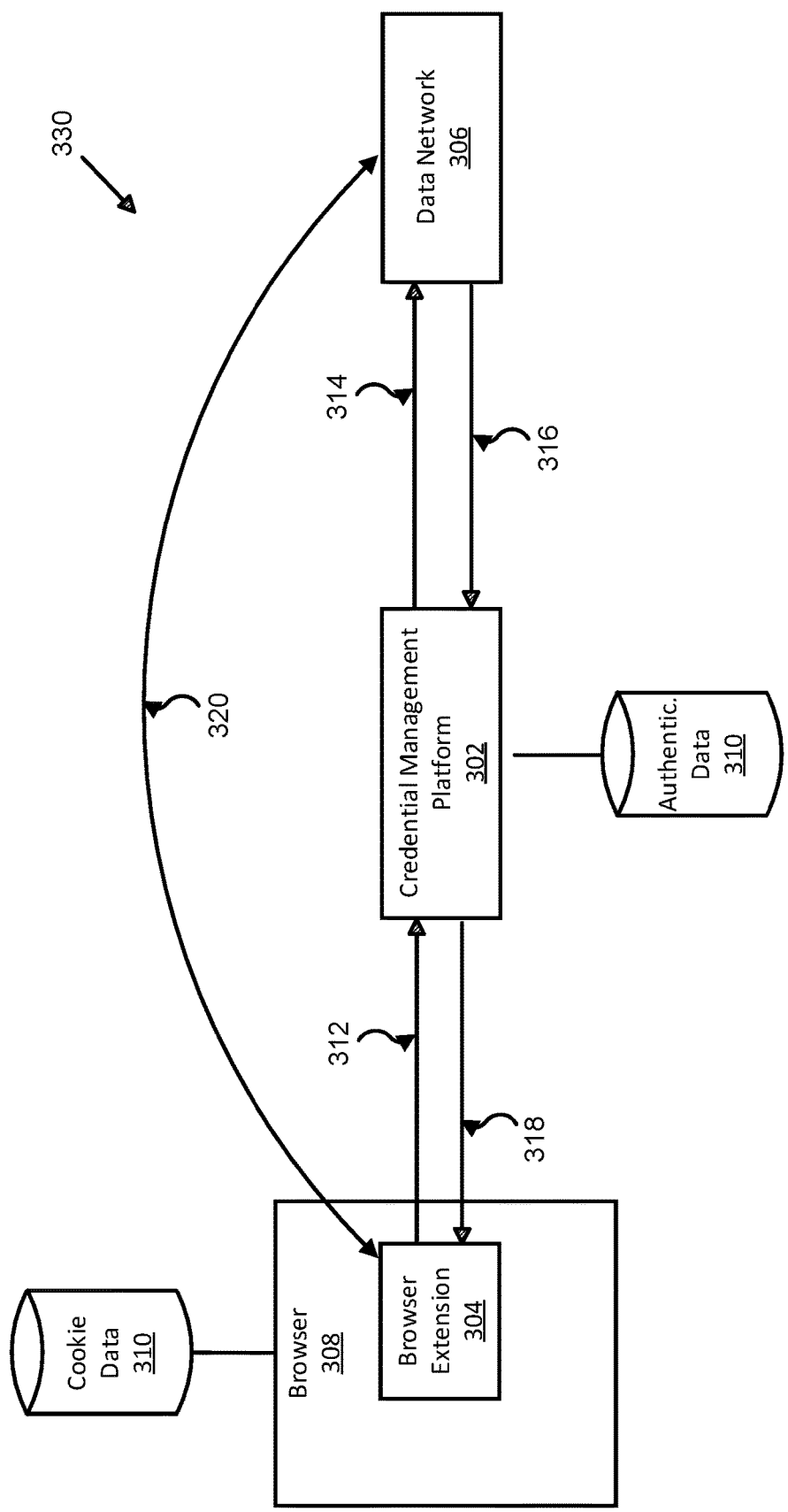
FIG. 3B illustrates an exemplary alternative data flow for credential and authentication management in scalable data networks.

FIG. 3B illustrates an exemplary alternative data flow for credential and authentication management in scalable data networks. Here, system 330 includes credential management platform 302, browser extension 304, data network 306, browser 308, cookie data 310, and data flow paths 312-320.

As described above in connection with FIG. 3A, system 330 and elements 302-318 are substantially similar in function, design, layout, and configuration. In this example, data path 320 is also shown, which enables browser 308 and data network 306 to transfer data directly over a data communication protocol. Although shown as a direct route, data path 320 may include one or more networking components (e.g., routers, switches, gateways, central offices, computers, servers, telecommunication equipment (wired or wireless), and the like) disposed between browser 308, browser extension 304, and data network 306. As an alternative embodiment, system 300 illustrates an alternative data flow diagram for credential and authentication management.

For example, authentication data may be provided by credential management platform 302 to data network 306 over data flow path 314 when browser extension 304 sends a control signal to credential management platform 302 indicating that a request to access data network 306 and establish a session has been initiated by browser 308. In other examples, a copy of a request sent by browser 308 and/or browser extension 304 may be sent over data path 312 to credential management platform 302, which then sends authentication data over data path 314 using a data communication protocol. In still other examples, when a session is established session data may be transferred by data network 306 to browser 308 and/or browser extension 304 over data path 320. If a change to credentials or authentication data occurs, data network 306 can transfer that data over data path 316 to credential management platform 302, which can subsequently pass a copy of said authentication data to browser 308 via browser extension 304. In still further alternative embodiments, if authentication data is changed by data network 306, when sent to browser 308 and browser extension 304 over data path 320, a copy of the authentication data may be sent to credential management platform 302 over data path 312. In yet another alternative embodiment, authentication data sent over data path 320 by data network 306 can be received by browser extension 304, but before being cached at browser 308, the authentication data can be forwarded to credential management platform 302 and used, in other examples, to enable access to data network 306 using the techniques described herein. In other examples, system 330 and the accompanying elements may be varied in design, configuration, and function without limitation to those shown and described.

Figure 4A:
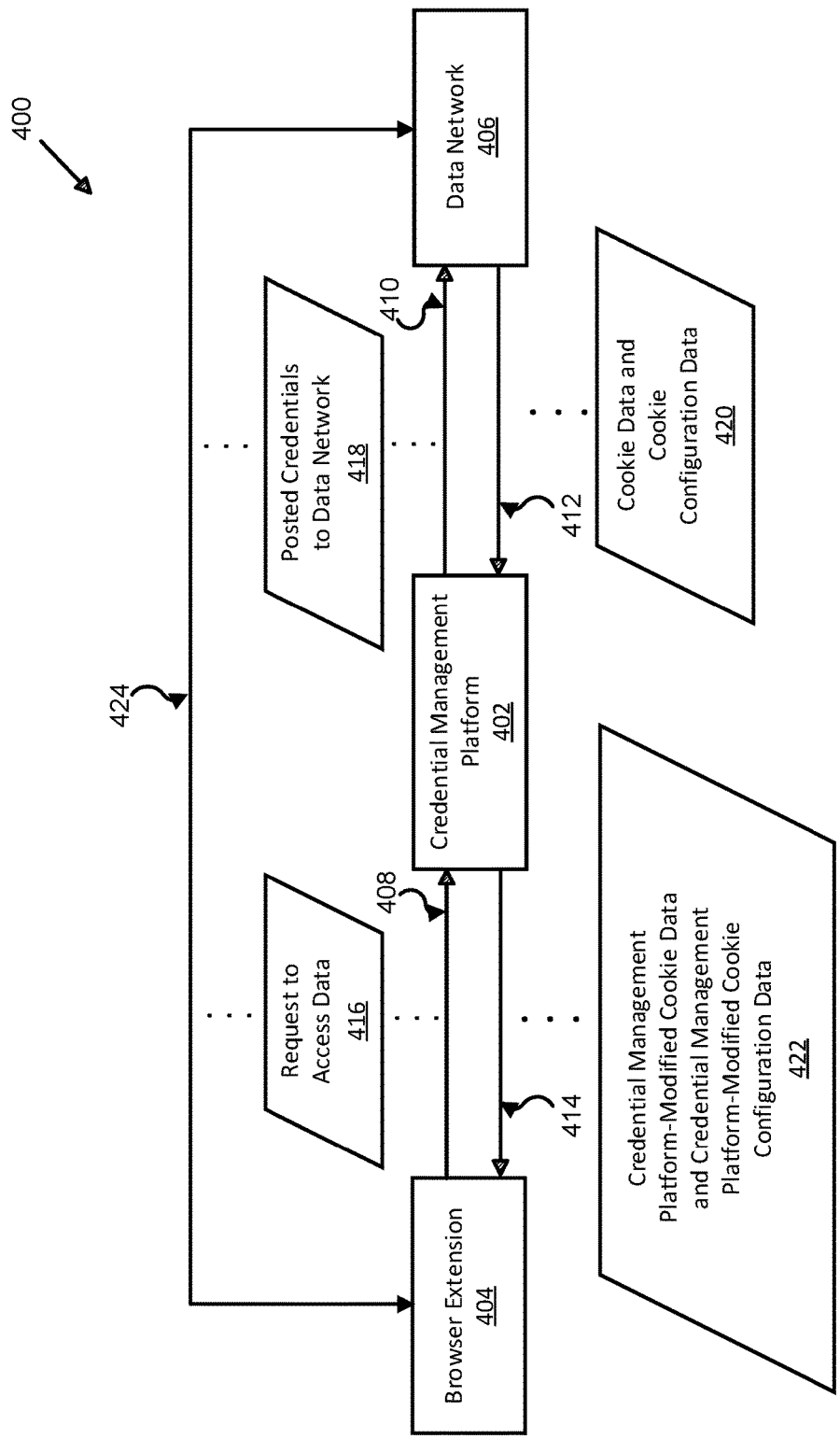
FIG. 4A illustrates an exemplary data diagram for credential and authentication management in scalable data networks.

FIG. 4A illustrates an exemplary data diagram for credential and authentication management in scalable data networks. Here, data flow diagram 400 includes credential management platform 402, browser extension 404, data network 406, data paths 408-414 and 424, and data files 416-422. As described above in connection with FIG. 3B, credential management platform 402 (which may be implemented similarly to platform 302 (FIG. 3) or platform 102 (FIG. 1)) may be configured to transmit authentication data 418 (e.g., credentials) to data network 406 over data path 410 in response to request 416 sent from browser extension 404. Upon approval of authentication data 418, data network 406 transmits cookie data and cookie configuration data 420 over data path 412 to browser extension 404, which is intercepted by credential management platform 402. In some examples, credential management platform 402 may be configured to modify cookie data and cookie configuration data 420 before forwarding over data path 414. Here, credential management platform-modified cookie data and cookie configuration data 422 may be sent to browser extension 404 over data path 414. In some examples, credential management platform 402 may configure cookie data and cookie configuration data to establish and/or control a session established between browser extension 404 and data network 406. While control signals and data may be transferred over data paths 408-414, session data may be transferred between browser extension 404 and data network 406 over data path 424. In other examples, data flow diagram 400 and the accompanying elements may be varied in design, configuration, and function without limitation to those shown and described.

Figure 4B:
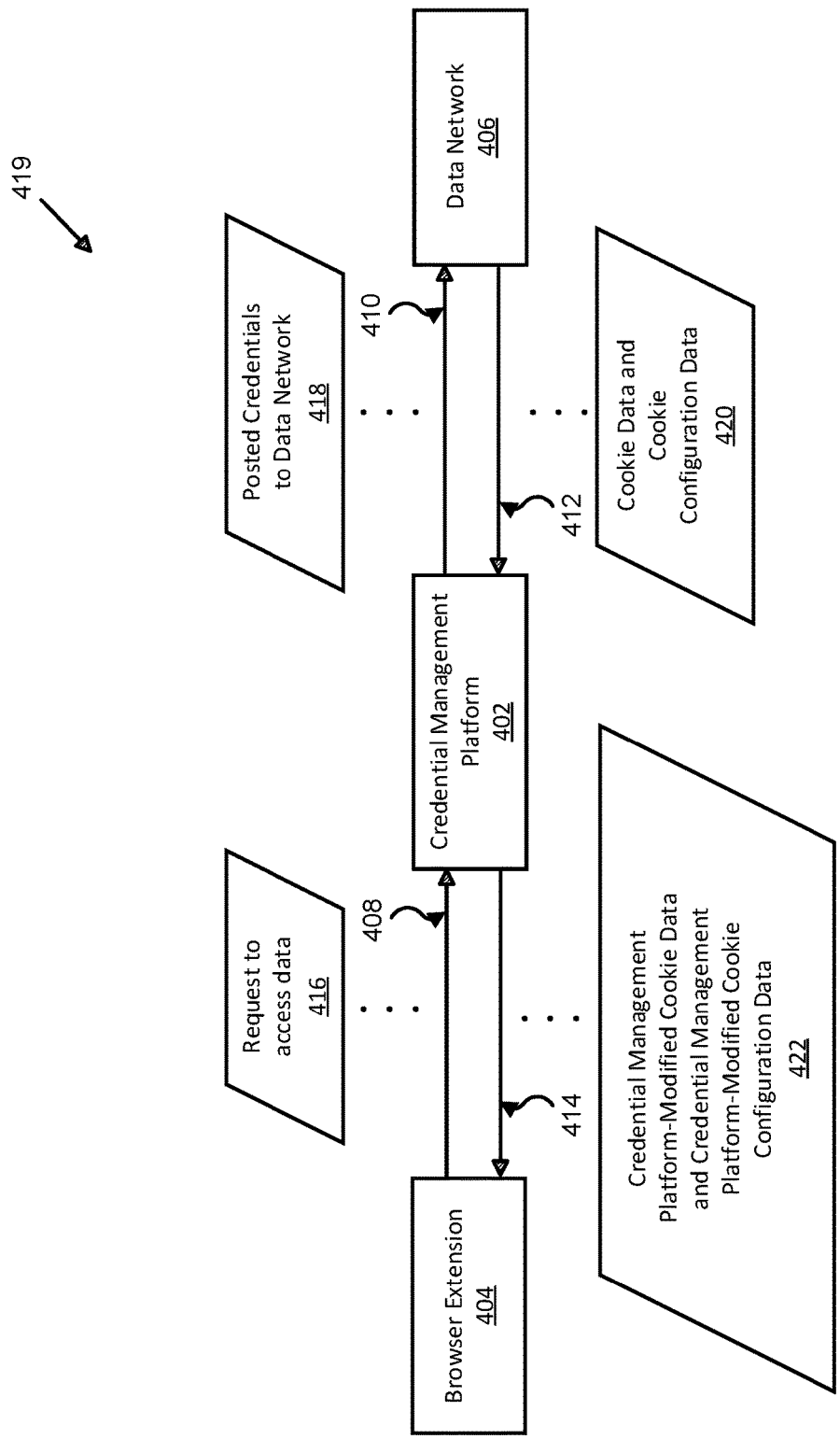
FIG. 4B illustrates an alternative exemplary data diagram for credential and authentication management in scalable data networks.

FIG. 4B illustrates an alternative exemplary data diagram for credential and authentication management in scalable data networks. Here, an alternative data flow diagram 419 is shown, including credential management platform 402, browser extension 404, data network 406, data paths 408-414, and data files 416-422. As described above, credential management platform 402 (which may be implemented similarly to platform 302 (FIG. 3) or platform 102 (FIG. 1)) and the elements shown that are numbered similarly to those elements shown and described above in connection with FIG. 4A may be similarly in function, design, operation, and configuration. For example, credential management platform 402 may be configured to transmit authentication data 418 (e.g., credentials) to data network 406 over data path 410. In this example, data path 424 (FIG. 4A) is removed and all data transferred between data network 406 and browser extension 404 is configured to be transferred using data paths 408-414 and passing through credential management platform 402. In so doing, credential management platform 402 may be configured to intercept, track, monitor, and perform other functions on authentication data 418, cookie data, cookie configuration data, session data, and modified versions thereof, entirely or partially. Here, as in FIG. 4A, browser extension 404 may be configured to post a GET request (e.g., authentication data 418) to data network 406 over data paths 408-410. If authentication data 418 is accepted by data network 406, cookie data and cookie configuration data 420 and session data 416 may be transferred to browser extension 404 using one or more of data paths 408-414. In other examples, different data paths may be used and the examples shown and described are provided as illustrative examples only. In other examples, data flow diagram 419 and the accompanying elements may be varied in design, configuration, and function without limitation to those shown and described.

Figure 4C:
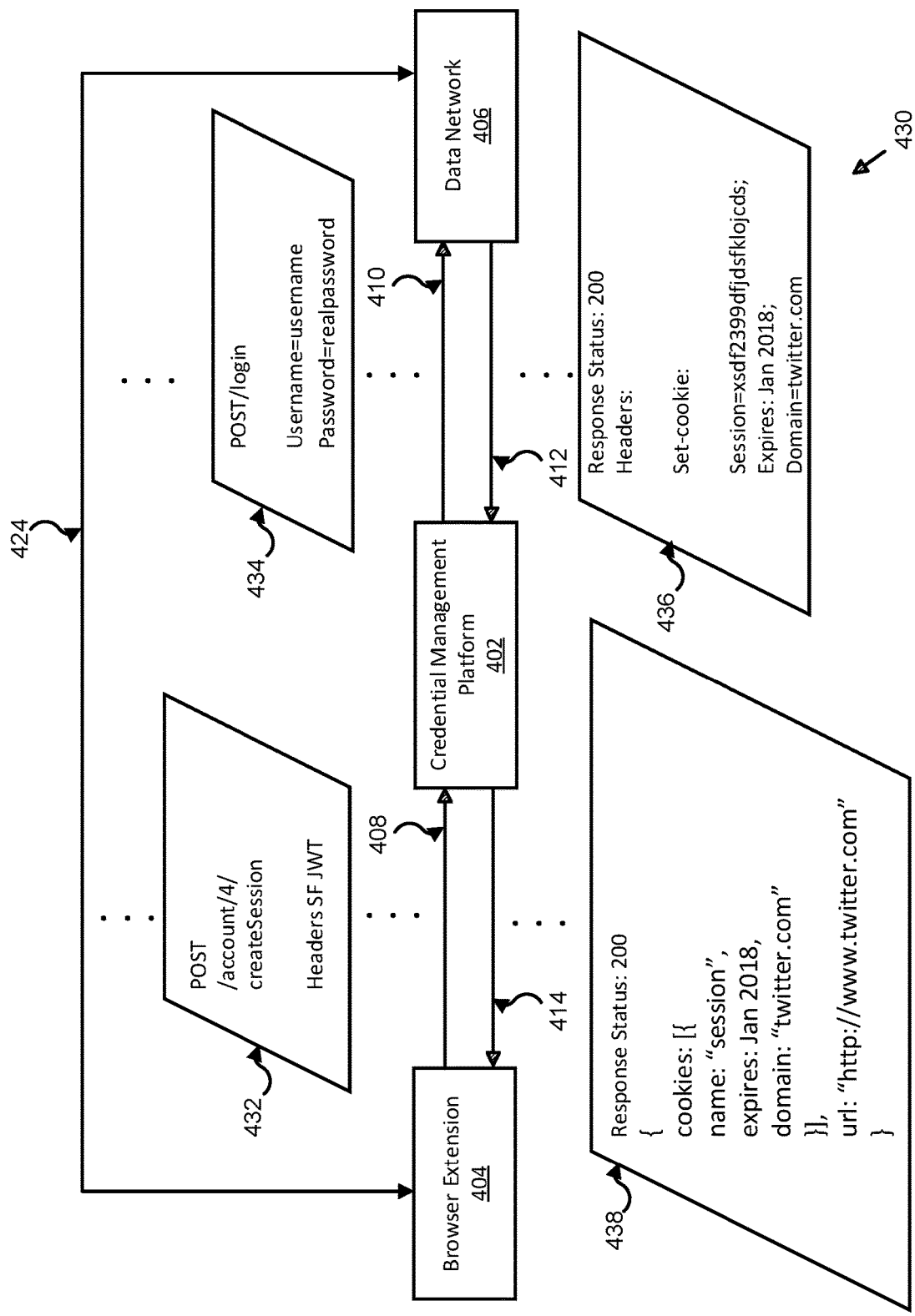
FIG. 4C illustrates an exemplary data diagram illustrating various GET and POST requests for credential and authentication management in scalable data networks.

FIG. 4C illustrates an exemplary data diagram illustrating various GET and POST requests for credential and authentication management in scalable data networks. Here (as in FIG. 4A), data flow diagram 430 includes credential management platform 402, browser extension 404, data network 406, data paths 408-414 and 424, and data files 432-438. As described above, credential management platform 402 (which may be implemented similarly to platform 302 (FIG. 3) or platform 102 (FIG. 1)) and the elements shown that are numbered similarly to those elements shown and described above in connection with FIG. 4A may be similarly in function, design, operation, and configuration. In this example, post calls and responses are shown as illustrative examples of authentication data and session data that may be exchanged between data network 406 and browser extension 404 (which may be installed on a browser (not shown)). As an example, data file 432 may be a post call made by browser extension 404 to request access to data network 406 (and data controlled or gated by it) similar to request 416 (FIG. 4A, 4B). Upon receiving the post call from browser extension 404, credential management platform 402 pass the post call request to data network 406, which (if the authentication data is accepted), generates response 436, including a session ID (e.g., "Session=xsdf2399dfjdsfklojcds"), cookie, expiration date (e.g., January 2018), and a domain name at which data network 406 may be accessed by a browser (not shown) on which browser extension 404 is installed. Data file 436 is then received and stored by credential management platform 402 before forwarding the session and cookie data (e.g., data file 438) to browser extension 404. Data files 432-438 may be stored by credential management platform 402 in various types of databases, data structures, or data facilities (hereafter "data facilities") that are directly, indirectly, locally, or remotely coupled (i.e., in data communication with) to credential management platform. Examples of these types of data facilities may include cookie data 132, session data 134, or credential data 138 (FIG. 1). In other examples, data flow diagram 430 and the accompanying elements may be varied in design, configuration, and function without limitation to those shown and described.

Figure 4D:
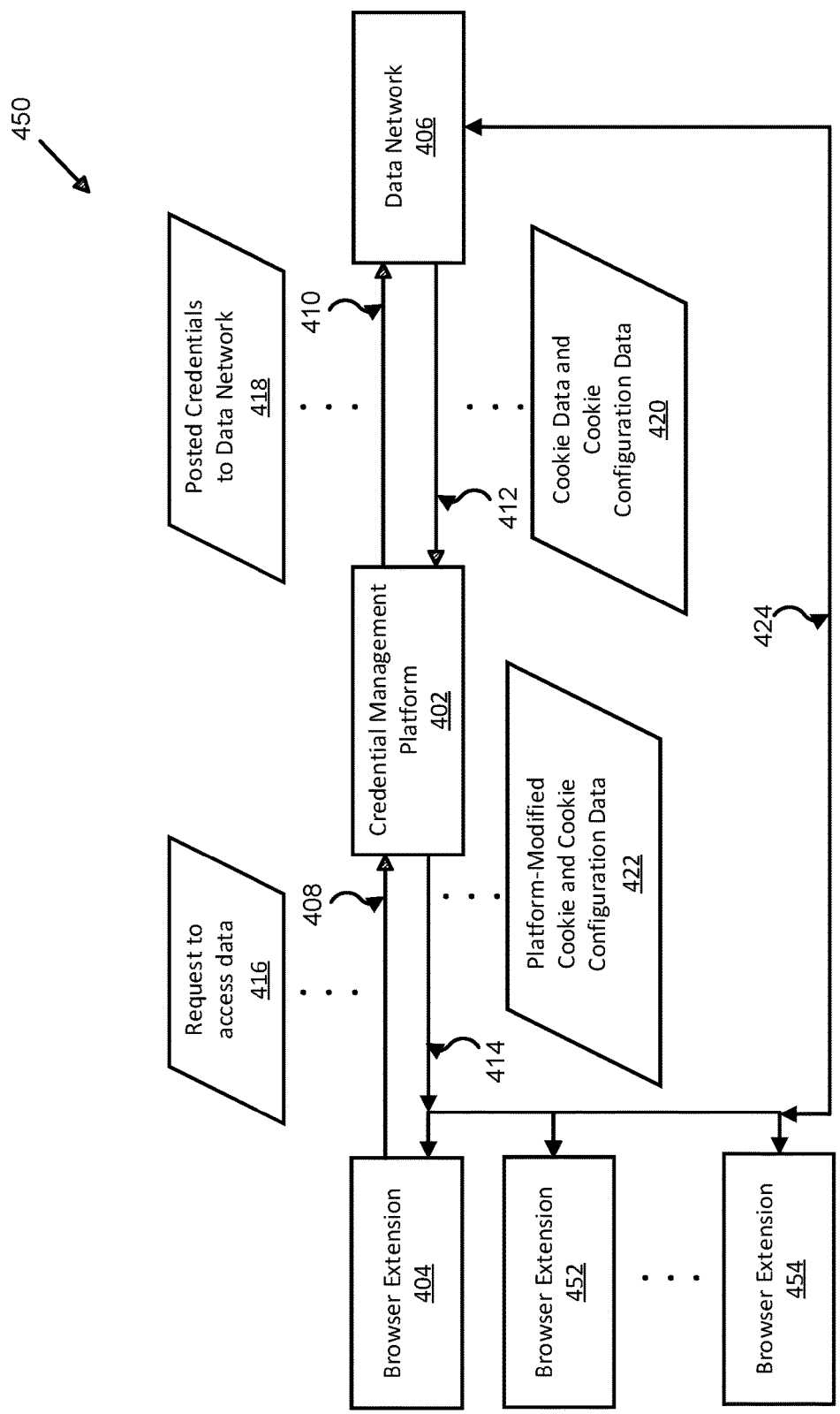
FIG. 4D illustrates a further exemplary alternative data diagram for credential and authentication management in scalable data networks.

FIG. 4D illustrates a further exemplary alternative data diagram for credential and authentication management in scalable data networks. Here, data flow diagram 400 includes credential management platform 402, browser extensions 404 and 452-454, data network 406, data paths 408-414 and 424, and data files 416-422. As described above, credential management platform 402 (which may be implemented similarly to platform 302 (FIG. 3) or platform 102 (FIG. 1)) and the elements shown that are numbered similarly to those elements shown and described above in connection with FIG. 4A may be similarly in function, design, operation, and configuration. In this example, credential management platform 402 may be configured to transfer authentication data and session data (e.g., data files 416-422) to browser extensions 404 and 452-454. In some examples, a system (e.g., system 100 (FIG. 1), system 200 (FIG. 2)) may be scaled to implement one or more browser extensions that are installed on separate browsers and computing systems (e.g., desktops, laptops, mobile computing devices, smart phones, tablet computers, and the like) without limitation. The techniques shown and described herein may be used to enable credential management platform 402 to scale and support any number of users while employing a single account (i.e., the authentication data for a single account). In some examples, browser extensions 452-454 are in data communication with credential management platform 402, similarly to browser extension 404. Browser extensions 452-454, in some examples, are configured to be installed on browsers associated with clients (not shown) similar to those described above in connection with FIG. 1. The techniques described herein, in some examples, permit session data and authentication data to be transferred between browser extensions 404 and 452-454 and data network 406 over various data paths (e.g., data paths 408-414 and 424) and may be varied. For example, in some examples, session data and authentication data may be transferred to browser extensions 404 and 452-454 over data paths 408-414, passing data through credential management platform 402. In other examples, data may be transferred over data path 424 in addition to data paths 408-422. In still other examples, data may be transferred over a combination of data paths 408-422 and 424. For example, authentication data may be passed from credential management platform 402 to data network 406 over data path 410 while session data is sent to one or more of browser extensions 404 and 452-454 over data path 424 and/or over data paths 412-414 through credential management platform 402. In other examples, data flow diagram 450 and the accompanying elements may be varied in design, configuration, and function without limitation to those shown and described.

Figure 5A:
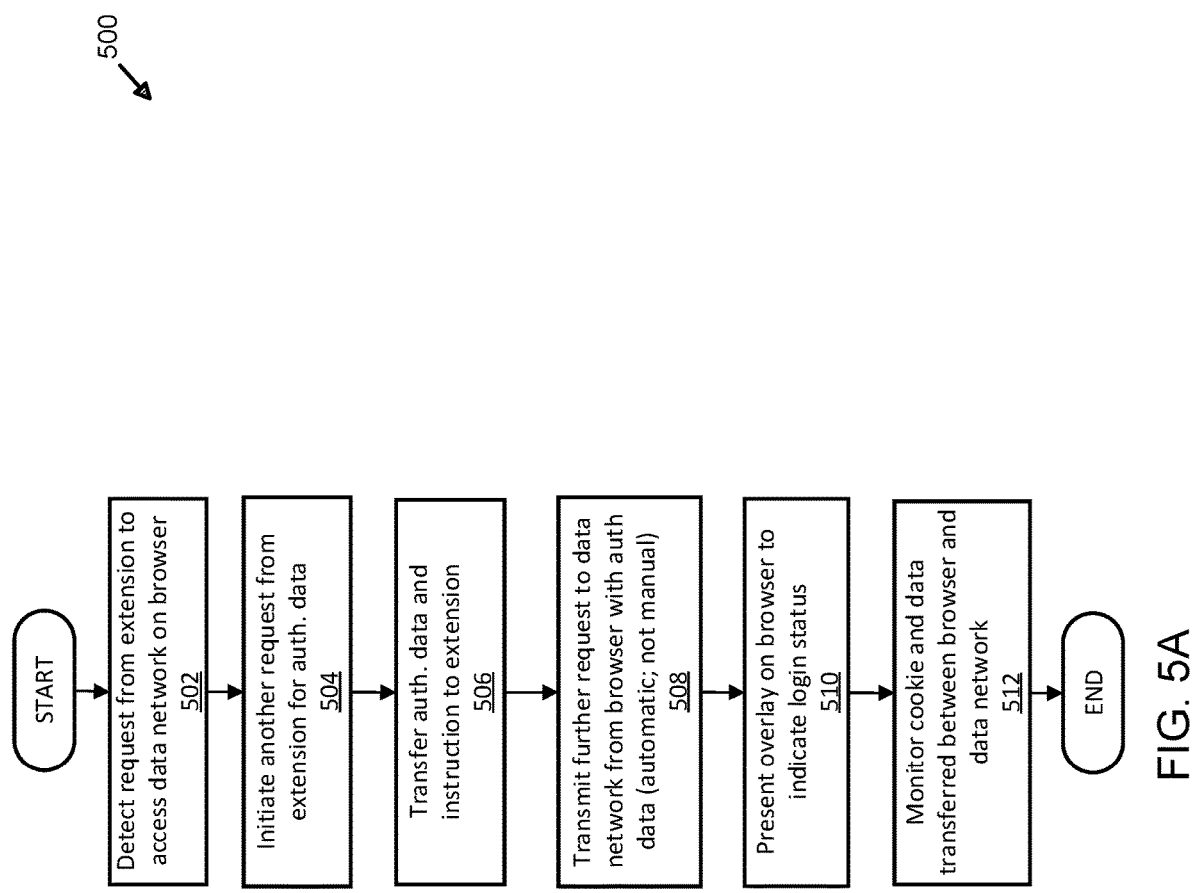
FIG. 5A illustrates an exemplary process for credential and authentication management in scalable data networks.

FIG. 5A illustrates an exemplary process for credential and authentication management in scalable data networks. Here, process 500 starts when a request is detected from an extension (e.g., browser extension 304 (FIGS. 3A, 3B)) to access data on a data network (e.g., data networks 128-130 (FIG. 1)) (502). In some examples, a request may be initiated by a browser on which an extension is installed, as described above. Included with the initial request to access a data network may also be a request for authentication data to a credential management module, which may be a call or request initiated by an extension directly without requiring user input (504). In some examples, a request from a credential management platform to a data network may include authentication data included in, for example, a POST call or request. Upon receipt of authentication data by a credential management platform from the data network, authentication data is transferred to a browser via an extension including an instruction to initiate a session with a given data network (506). Using the authentication data, an extension may initiate a further request (e.g., GET call or request) to a data network for access (508). If the authentication data is accepted and a session is established between the data network and the extension (and the browser on which the extension is installed), a display element may be presented on a graphical user interface to provide information associated with the session such as a login status, time to expiration of the session, or interactive features such as a button to renew the session (or initiate a request to renew the current session) or request access to other data not previously authorized for access based on the current set of credentials, authentication data, login data, or the like (510). Upon establishing a session, a credential management platform (e.g., platform 102 (FIG. 1)) may be configured to monitor data traffic flowing (i.e., transferred) between one or more browsers (i.e., browser extensions) and one or more data networks (e.g., data networks 128-130 (FIG. 1)) (512). In other examples, process 500 may be implemented differently and is not limited to the order, operations, steps, sub-processes, steps, or other aspects as shown and described.

Figure 5B:
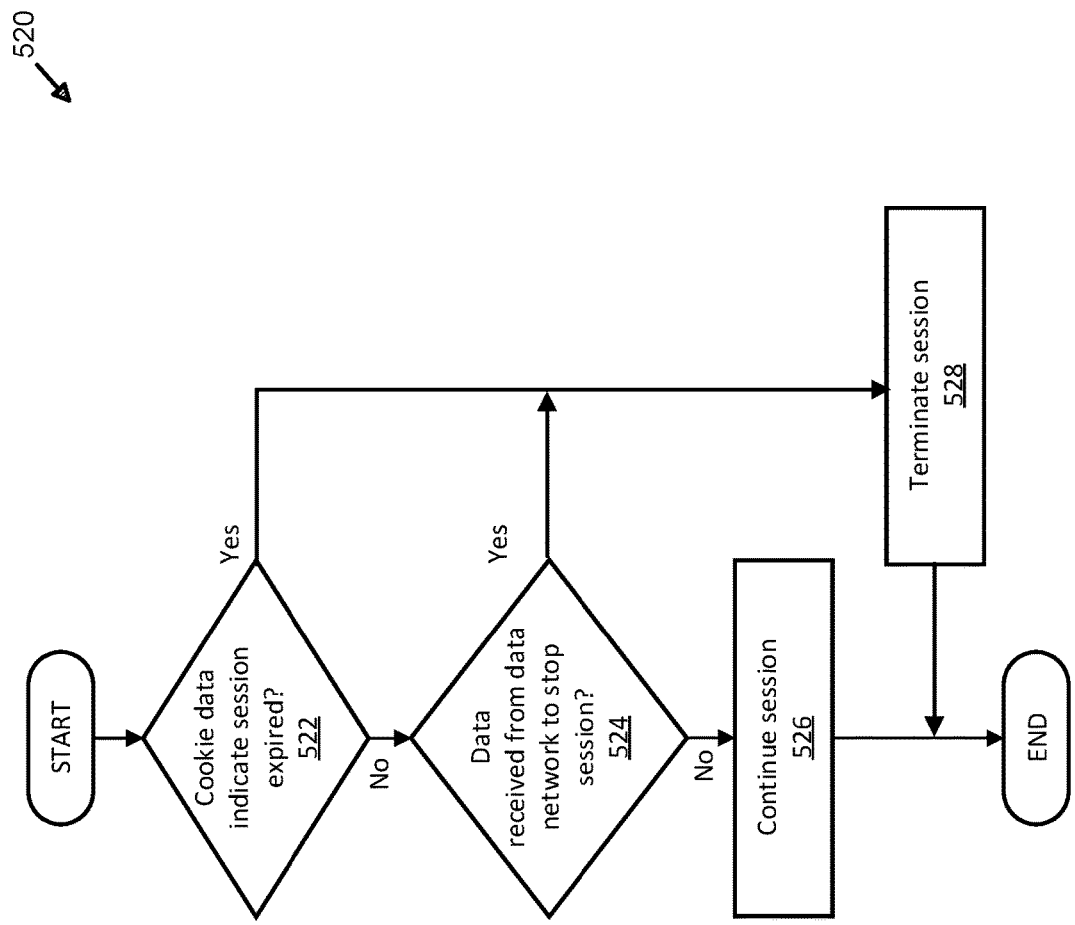
FIG. 5B illustrates an additional exemplary process for credential and authentication management in scalable data networks.

FIG. 5B illustrates an additional exemplary process for credential and authentication management in scalable data networks. Here, process 520 is a further process or sub-process of process 500 (FIG. 5A) and may be implemented as a continuation thereof or as a further set of processes executed by configurable computing resources such as a server, computer, client, or the like. In some examples, a determination is made as to whether cookie data transferred from a data network indicates whether a given session has expired (522). If the session has expired, the session is terminated and access is revoked to a given browser (528). If a session has not expired, a further determination is made as to whether data or control signals have been received from a data network to terminate (i.e., stop) a session (524). In some examples, a session may not be assigned an expiration date/time by a data network, but instead terminated by a data network on a given schedule or at will. If data or control signals are received indicating the session between a browser and a data network should be terminated, then the session is terminated (528). However, if no data or control signals are received to terminate a session, the session continues (i.e., access by browser to a given data network is authorized to permit data transfer over one or more data communication protocols such as those described herein) (526). In other examples, process 520 may be implemented differently and is not limited to the order, operations, steps, sub-processes, steps, or other elements as shown and described.

Figure 5C:
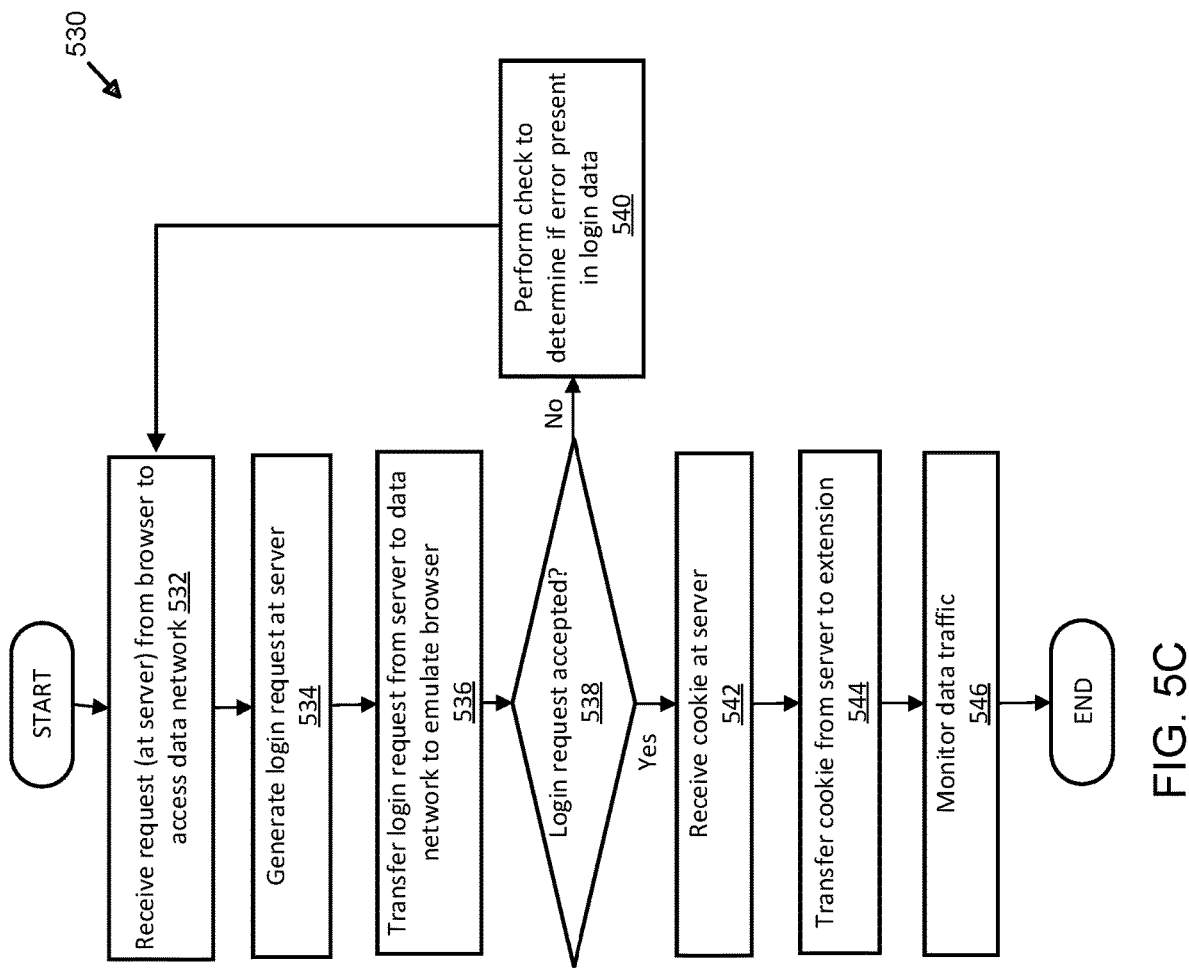
FIG. 5C illustrates an alternative exemplary process for credential and authentication management in scalable data networks.

FIG. 5C illustrates an alternative exemplary process for credential and authentication management in scalable data networks. Here, process 530 begins when a credential management platform (e.g., platform 102 (FIG. 1)) receives a request from a browser to access a data network (532). Next, a login request is generated at a server (e.g., credential management platform) (534). Once generated, a login request is transferred from a server (e.g., credential management platform (e.g., platform 102 (FIG. 1)) to a data network (536). As described herein, when platform 102 (i.e., credential management platform) transfers a login request from a browser to a server, the login request is transmitted and configured to emulate the browser. In other words, a login request transmitted from platform 102 may be configured to emulate a browser based on, for example, an address or other attribute. A determination is made as to whether a login request has been accepted (538). In some examples, a login request may also be configured to include login data, authentication data, or other data that may be approved for access to a data network.

Referring back to FIG. 5C, if the login data is not accepted, then a check is performed to determine whether an error in data retrieval, storage or processing has occurred (540). In some examples, a check may be performed by platform 102 using various types of error checking techniques, including processes for applying hashing algorithms to determine if login data retrieved from, for example, credential data 138 (FIG. 1) is corrupted or erroneous.

Alternatively, if the login data is accepted, then the intended data network generates and sends a cookie, which is received by credential management platform (e.g., platform 102 (FIG. 1)) (542). Upon receipt of a cookie to establish a session, platform 102 may be configured to further process (e.g., copy, cache, modify, or the like) the cookie before transferring it using a data communication protocol to a browser extension, such as those described above (544). Once a session has been established, a credential management platform may be configured to monitor data traffic flowing between a data network and a browser and browser extension (546). In other examples, process 530 may be implemented differently and is not limited to the order, operations, steps, sub-processes, steps, or other elements as shown and described.

Figure 6A:
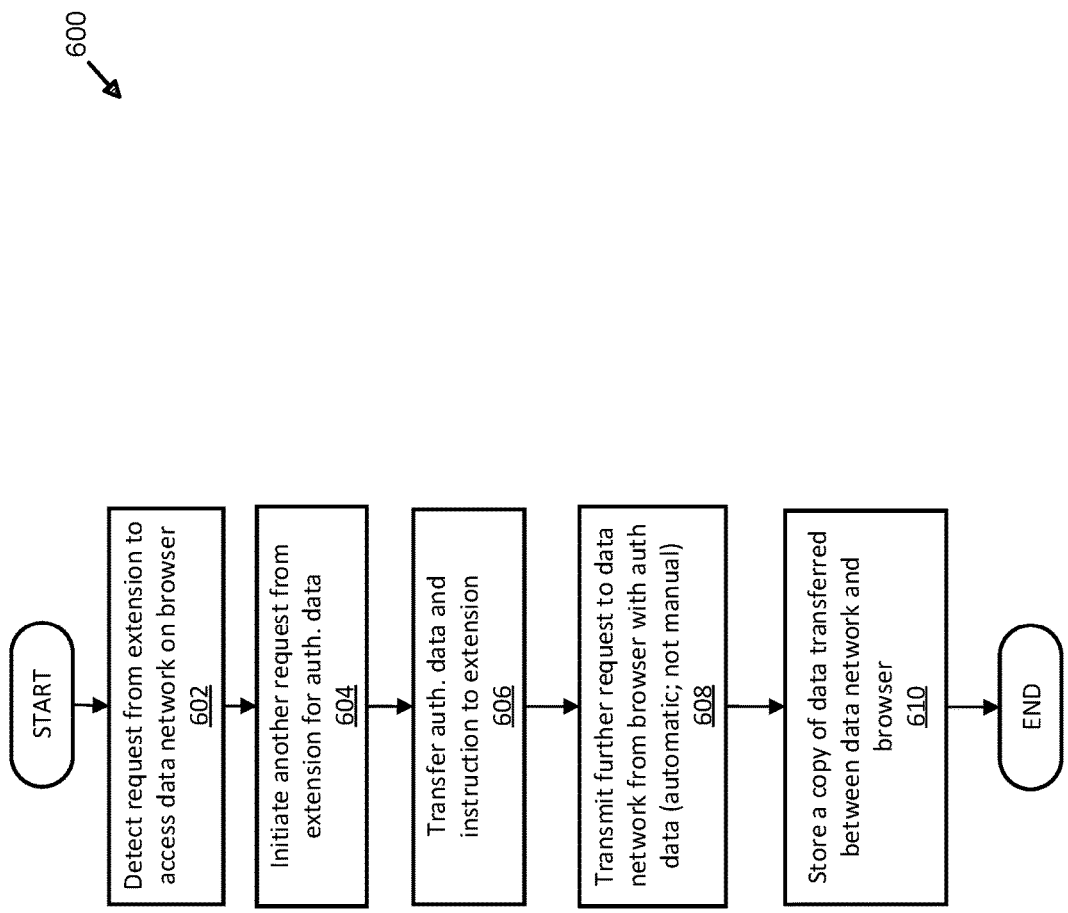
FIG. 6A illustrates an exemplary process for native activity tracking using credential and authentication management techniques in scalable data networks.

FIG. 6A illustrates an exemplary process for native activity tracking using credential and authentication management techniques in scalable data networks. Here, process 600 begins by detecting a request from an extension (e.g., browser extension 304 (FIGS. 3A-3B)) to a data network (602). In some examples, a request to access a data network may be initiated by a user directing a browser to a given address on the World Wide Web ("web"), Internet, application, or other destination. Next, another request is generated from the extension, although without requiring manual or user input, to request login data or authentication data from a credential management platform (e.g., platform 102 (FIG. 1)) (604). If platform 102 has access to stored authentication data, it is retrieved and transferred to the extension (606). Upon receipt of the authentication data, the browser transmits a login request to the data network with the authentication data (608). Once the authentication data is received and approved and a session is established between a browser and a data network, data transferred may be stored by credential management platform 302 (FIGS. 3A-3B) (610). In some examples, stored session data (e.g., data stored in session data 134) may be used by credential management platform 302 for various purposes including evaluation and assessment, as described in further detail below in connection with FIG. 6B. In other examples, process 600 may be implemented differently and is not limited to the order, operations, steps, sub-processes, steps, or other elements as shown and described.

Figure 6B:
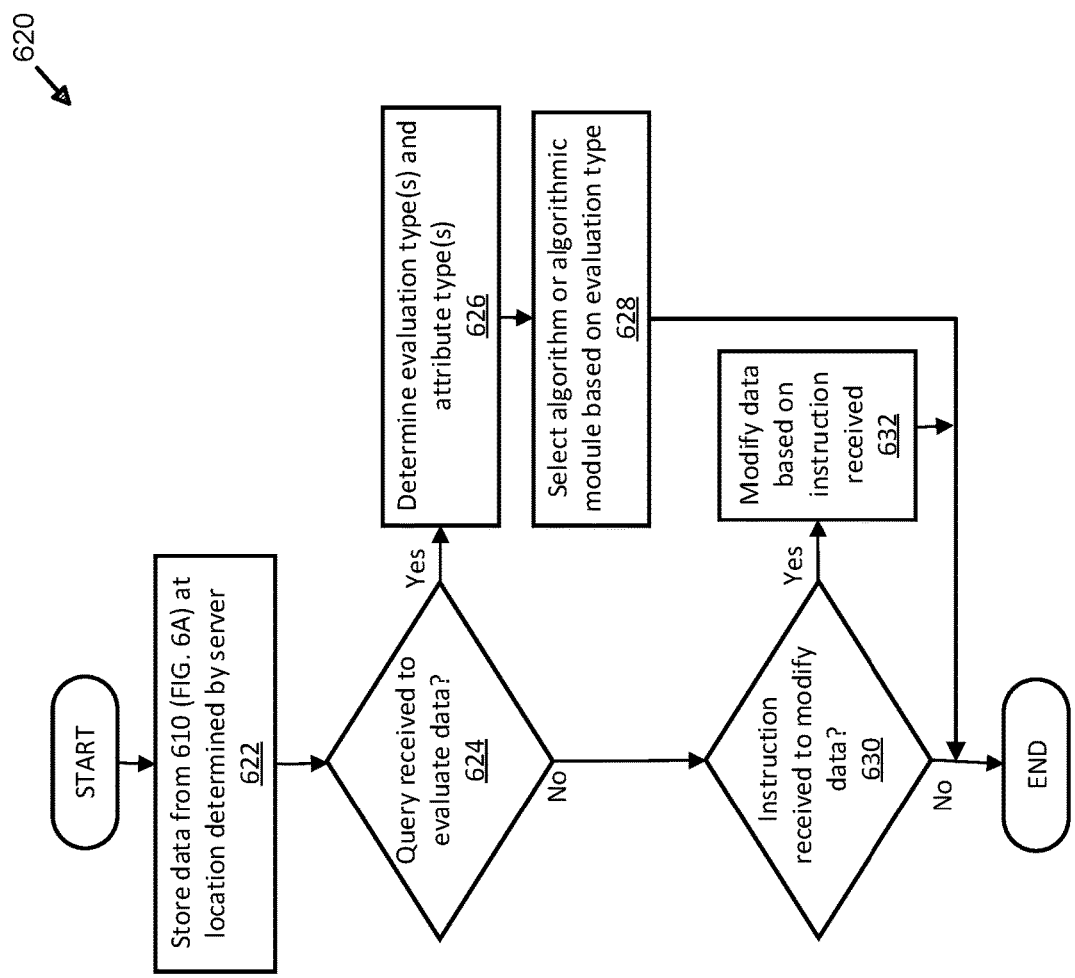
FIG. 6B illustrates an additional exemplary process for native activity tracking using credential and authentication management techniques in scalable data networks.

FIG. 6B illustrates an additional exemplary process for native activity tracking using credential and authentication management techniques in scalable data networks. Here, process 620 begins by storing data at a location specified by a server (e.g., a computing resource providing an operating environment for credential management platform 302 (FIGS. 3A-3B) or 402 (FIGS. 4A-4D)) (622). A determination is made as to whether a query has been received to evaluate data from a session, which may include session data, authentication data, login data, or other data transferred between a data network and one or more browsers (624). If a query is received to perform an evaluation, then a determination is made to the requested evaluation type and any attributes or attribute types associated with the evaluation requested (626). Next, an evaluation algorithm or set of algorithms is selected to perform the requested evaluation (628).

Alternatively, if a query (i.e., request) is not received to perform an evaluation, then a further determination is made as to whether an instruction is received to modify data stored or accessed by a credential management module (630). If said instruction is not received, then process 620 ends. If an instruction to modify stored data is received by credential management platform 302 or 402, then modification(s) requested are performed (632) and process 620 ends. Examples of modifications that may be requested by an extension include extending a session, terminating a session, requesting access to a session already in progress with another client, or multiple client authorization requests. In other examples, process 620 may be implemented differently and is not limited to the order, operations, steps, sub-processes, steps, or other elements as shown and described.

Figure 7A:
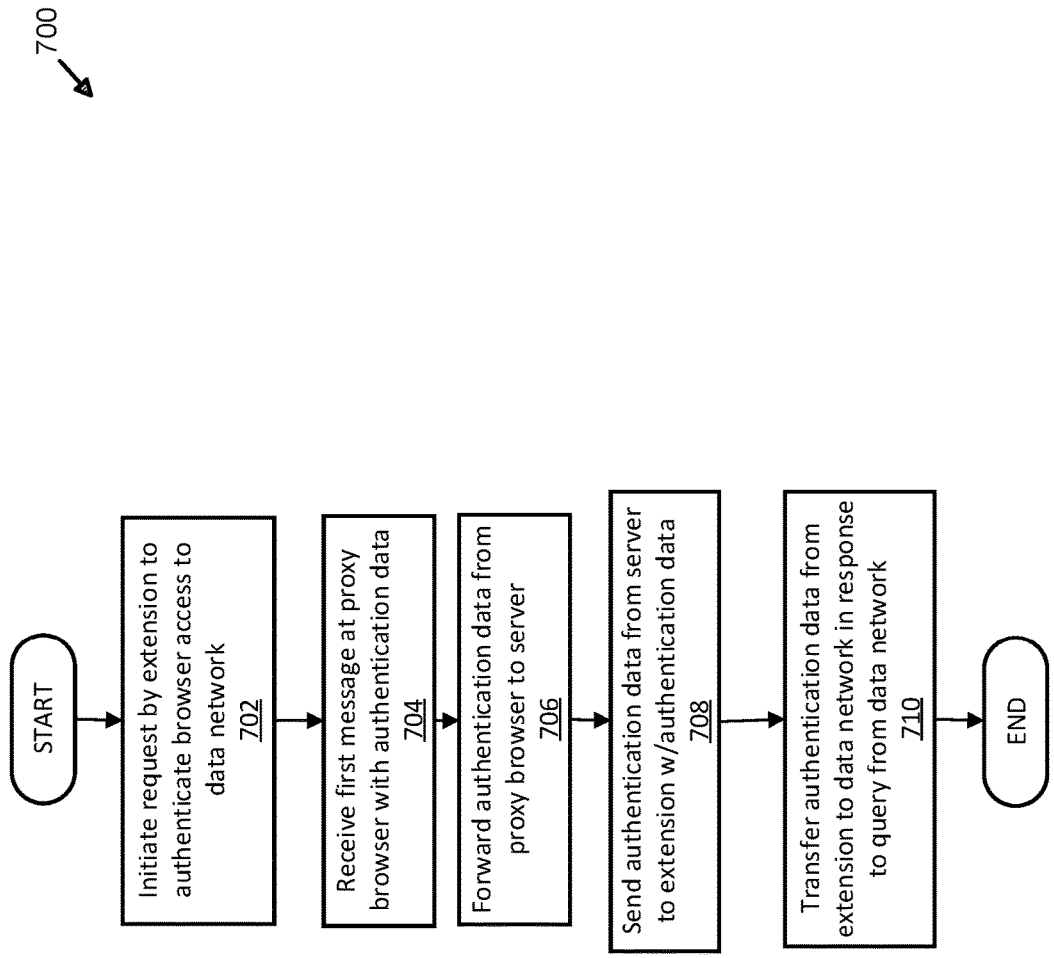
FIG. 7A illustrates an exemplary process for multi-factor authentication using credential and authentication management techniques in scalable data networks.

FIG. 7A illustrates an exemplary process for multi-factor authentication using credential and authentication management techniques in scalable data networks. Here, process 700 begins by an extension initiating a request to authenticate access through a browser to a data network (702). A first message from a data network sent in response to the initiated request is received at a proxy browser (704). As used herein, a "proxy browser" refers to another browser other than a browser requesting access to a data network, but which is associated with a given account. For example, when an authorized account is created on a given data network, a proxy browser may one associated with the account, but which is not requesting access as described above in connection with 702. Here, a proxy browser may receive authentication data such as an authentication code that, when access is requested, a data network sends a responsive request that is rendered graphically in a browser requesting input of the previously sent authentication data or authentication code.

Referring back to FIG. 7A, after a proxy browser receives authentication data from a data network, said authentication data (e.g., authentication code) is forwarded to a credential management platform (e.g., 302 (FIGS. 3A-3B), 402 (FIGS. 4A-4D)) (706). Subsequently, the authentication data is forwarded to an extension installed on the browser that initially requested access (708). Once received by the extension, the authentication data is transferred using a data communication protocol from the extension (and the browser on which the extension is installed) to the data network (710). In other examples, process 700 may be implemented differently and is not limited to the order, operations, steps, sub-processes, steps, or other elements as shown and described.

Figure 7B:
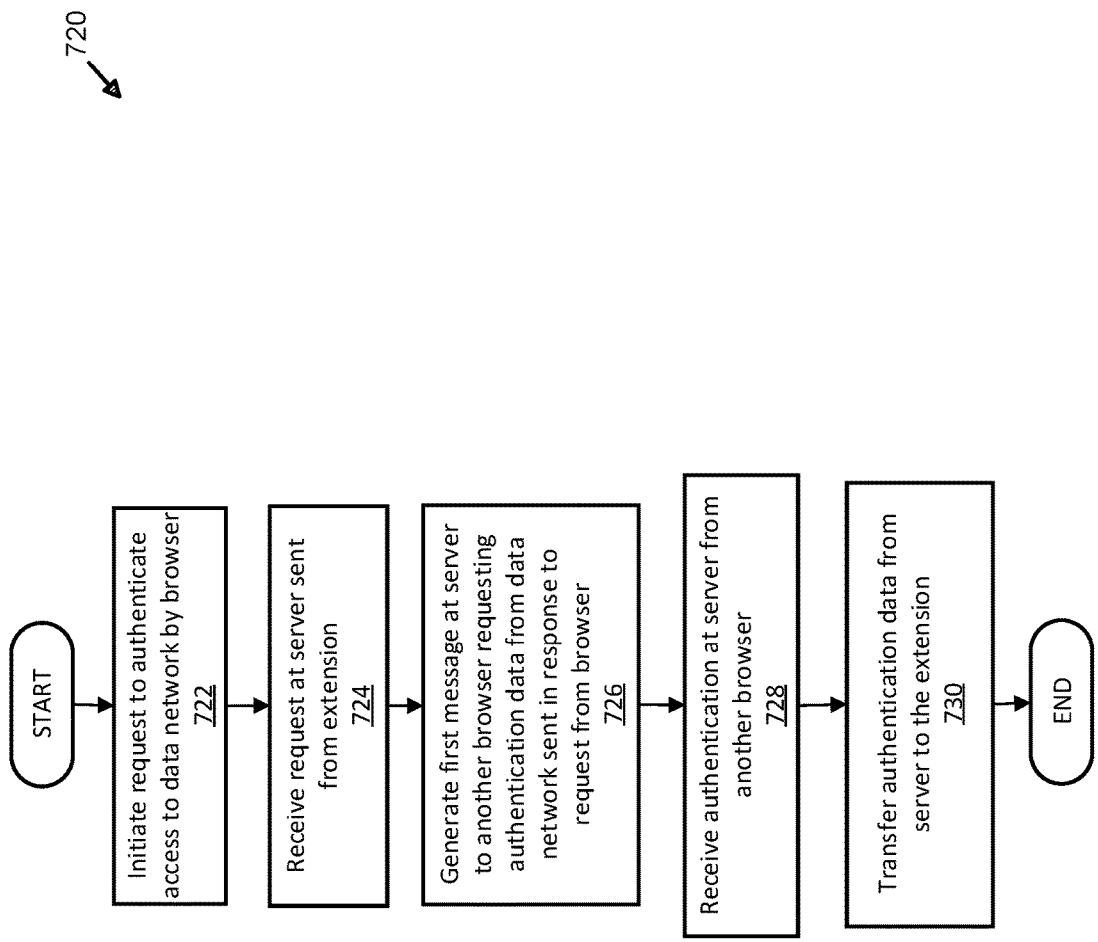
FIG. 7B illustrates an additional exemplary process for multi-factor authentication using credential and authentication management techniques in scalable data networks.

FIG. 7B illustrates an additional exemplary process for multi-factor authentication using credential and authentication management techniques in scalable data networks. Here, process 720 begins when a request is initiated by an extension to authenticate access to a data network by a browser (722). In some examples, the request is sent substantially simultaneously by the extension to a credential management platform and a data network to which the extension is requesting access. Once transmitted from the extension over a data path using a data communication protocol such as HTTP, TCP/IP, or others, the request is received at a server (e.g., credential management platform 302 (FIGS. 3A-3B) or 402 (FIGS. 4A-4D) (724). Upon receipt of the request, credential management platform 302 or 402 sends a further request to another browser requesting authentication data sent from a data network in response to the request from the extension (726). As described above, another browser may be configured as a proxy browser and receive authentication data in response to a request from another browser.

Referring back to FIG. 7B, in response to the request from the credential management platform, authentication data is received by a server hosting the credential management platform (728). Upon receipt and further processing, if any, the authentication data may be stored, cached, copied, manipulated, or modified and forwarded to the extension (730). In some examples, the above-described process may be referred to as a "multi-factor authentication" process in which individual requests transfer separate authentication data that, when submitted in response to subsequent queries, provide authenticated access to a data network. In other words, multi-factor authentication can be performed using processes 700 or 720 by requesting different elements of authorization data from different browsers. In other examples, process 720 may be implemented differently and is not limited to the order, operations, steps, sub-processes, steps, or other elements as shown and described.

Figure 8:
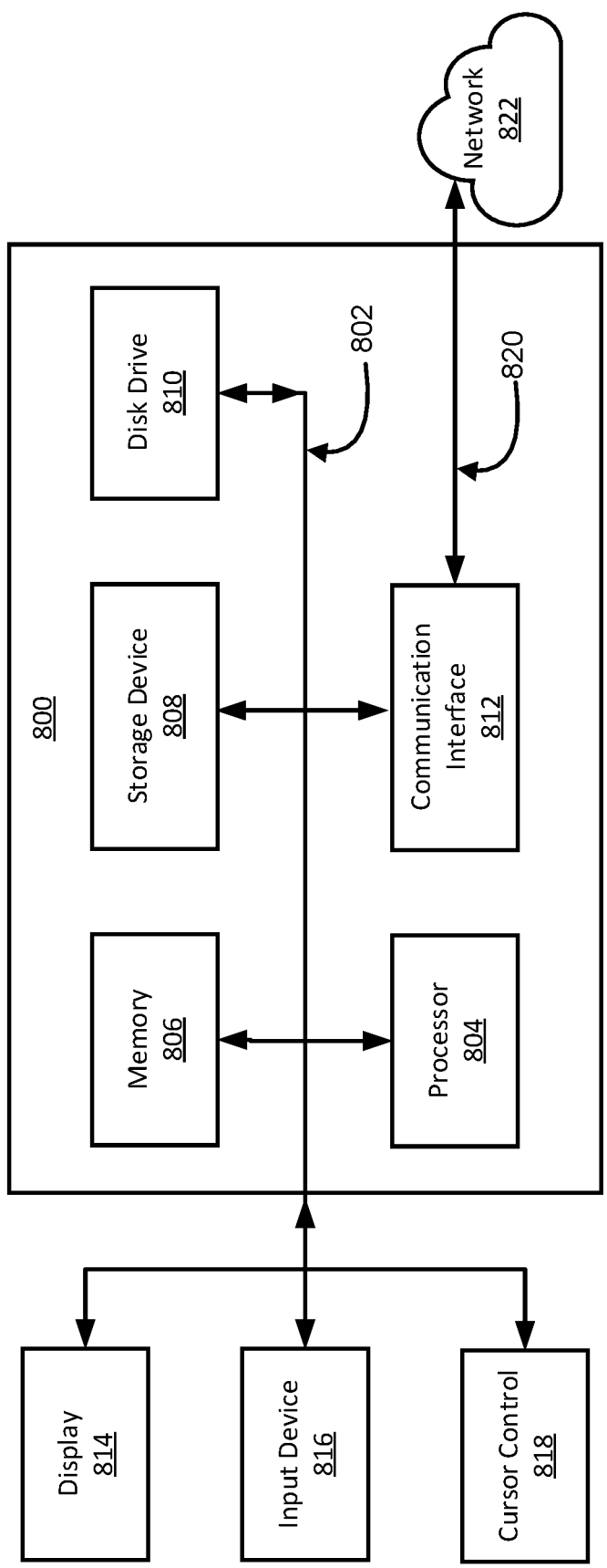
FIG. 8 illustrates an exemplary computing system suitable for proxied multi-factor authentication using credential and authentication management techniques in scalable data networks.

FIG. 8 illustrates an exemplary computing system suitable for proxied multi-factor authentication using credential and authentication management techniques in scalable data networks. In some examples, computer system 800 may be used to implement computer programs, applications, methods, processes, or other software to perform the above-described techniques. Computing system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), cursor control 818 (e.g., mouse or trackball), communication link 820, and network 822.

According to some examples, computing system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any tangible medium that participates in providing instructions to processor 804 for execution. Such a medium may take many forms, including but not limited to, non-volatile media and volatile media. Non-volatile media includes, for example, optical or magnetic disks, such as disk drive 810. Volatile media includes dynamic memory, such as system memory 806.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 800. According to some examples, two or more computing system 800 coupled by communication link 820 (e.g., LAN, PSTN, or wireless network) may perform the sequence of instructions in coordination with one another. Computing system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
   initiating a request by an extension to authenticate a browser to access a data network, the request being associated with an address and transmitted over HTTP, the extension being implemented in association of a first client computing device in a subset of computing devices each including at least one browser and a corresponding extension;
   receiving at a proxy browser a first message from the data network in response to the request, the first message comprising authentication data, the authentication data being forwarded to a server hosting a credential management module in data communication with the proxy browser and the browser, the proxy browser configured to facilitate access to a n account at the data network via the authentication data;
   sending a responsive request using a data processing data bus to a subset of executable instructions implementing the credential management module configured to request access to the data network, the data bus including the credential management module that is configured to direct storage of the authentication data when input, and retrieval of the authentication data when requested by the client, the responsive request requesting an instruction signal associated with the authentication data to provide access to the data network, the responsive request being rendered graphically in the browser to request input of previously-sent authentication data;
   sending a second message from the server to the extension or to the corresponding extension, the second message comprising the authentication data configured to facilitate access to the account in the data network by any computing device in the subset of computing devices; and
   transferring the authentication data to the data network from the browser and the extension or the at least one browser and the corresponding extension in response to a query from the data network,
   wherein different computing devices in the subset of computing devices implement the authentication data to access the account,
   wherein the subset of executable instructions implementing the credential management module is configured to modify configuration data to form platform-modified configuration data for a session between the extension and the data network.

2. The method of claim 1, wherein the authentication data comprises login data.

3. The method of claim 1, wherein the authentication data comprises session data and a cookie.

4. The method of claim 1, wherein the authentication data comprises a username and password.

5. The method of claim 1, wherein the proxy browser is associated with a second client computing device in distributed data communication with the data network and the server.

6. The method of claim 5, wherein the second client computing device has access to the data network using the login data and other session data and another cookie.

7. The method of claim 1, wherein the authentication data comprises session data including a time period during which a session between the browser and the data network is active.

8. The method of claim 1, wherein the second message comprises the authentication data and a cookie, the cookie being server-modifiable.

9. The method of claim 1, further comprising receiving at the browser authentication data from the data network if the authentication data sent from the browser and the extension to the query is accepted by the data network.

10. The method of claim 9, wherein the authentication data comprises query data transmitted from the data network to the browser.

11. The method of claim 9, wherein the authentication data comprises a session cookie.

12. The method of claim 1, further comprising receiving at the server and the extension a cookie if the response to the query is approved by the data network.

13. The method of claim 1, further comprising the browser receiving access to the data network if the response to the query is approved by the data network.

14. A non-transitory computer readable medium having one or more computer program instructions configured to perform a computerized method, the computerized method comprising:

receiving at a server a request to access a data network, the request being initiating a request by an extension to authenticate a browser to access a data network, the request being associated with an address and transmitted over HTTP, the extension being implemented in association of a first client computing device in a subset of computing devices each including at least one browser and a corresponding extension;

receiving at a proxy browser a first message from the data network in response to the request, the first message comprising authentication data, the authentication data being forwarded to a server hosting a credential management module in data communication with the proxy browser and the browser, the proxy browser being associated with an account accessible at the data network via the authentication data;

sending a responsive request using a data processing data bus to a subset of executable instructions implementing the credential management module configured to request access to the data network, the data bus including the credential management module that is configured to direct storage of the authentication data when input, and retrieval of the authentication data when requested by the client, the responsive request requesting an instruction signal associated with the authentication data to provide access to the data network, the responsive request being rendered graphically in the browser to request input of previously-sent authentication data;

sending a second message from the server to the extension or to the corresponding extension, the second message comprising the authentication data configured to facilitate access to the account in the data network by any computing device in the subset of computing devices; and transferring the authentication data to the data network from the browser and the extension in response to a query from the data network, wherein different computing devices in the subset of computing devices implement the authentication data to access the account and the subset of executable instructions implementing the credential management module is configured to modify configuration data to form platform-modified configuration data for a session between the extension and the data network.

15. The computerized method of claim 14, wherein the authentication data comprises login data.

16. The computerized method of claim 14, wherein the authentication data comprises session data and a cookie.

17. The computerized method of claim 14, wherein the authentication data comprises a username and password.

18. The computerized method of claim 14, wherein the proxy browser is associated with a second client computing device in distributed data communication with the data network and the server.

19. The computerized method of claim 18, wherein the second client computing device has access to the data network using the login data and other session data and another cookie.

20. The computerized method of claim 14, wherein the authentication data comprises session data including a time period during which a session between the browser and the data network is active.

* * * * *